US012591586B1

(12) United States Patent
Kalveks et al.

(10) Patent No.: US 12,591,586 B1
(45) Date of Patent: Mar. 31, 2026

(54) EFFICIENT PROCESSING AND DISPLAY OF DATA INSIGHTS

(71) Applicant: AlphaSights Ltd, London (GB)

(72) Inventors: Alexander Rudolph John Kalveks, London (GB); Srishti Nirula, London (GB)

(73) Assignee: ALPHASIGHTS LTD, London (GB)

( * ) Notice: Subject to any disclaimer, the term of this patent is extended or adjusted under 35 U.S.C. 154(b) by 0 days.

(21) Appl. No.: 19/079,162

(22) Filed: Mar. 13, 2025

(51) Int. Cl.
　*G06F 16/00*　　(2019.01)
　*G06F 16/22*　　(2019.01)
　*G06F 16/248*　　(2019.01)
　*G06F 16/28*　　(2019.01)

(52) U.S. Cl.
　CPC ........ *G06F 16/248* (2019.01); *G06F 16/2282* (2019.01); *G06F 16/285* (2019.01)

(58) Field of Classification Search
　CPC ... G06F 16/248; G06F 16/285; G06F 16/2282
　USPC ................................................. 707/600–899
　See application file for complete search history.

(56) References Cited

U.S. PATENT DOCUMENTS

| | | | | |
|---|---|---|---|---|
| 11,989,261 | B2 * | 5/2024 | Canim | G06F 16/248 |
| 12,360,977 | B2 * | 7/2025 | Glass | G06F 16/24578 |
| 2019/0205726 | A1 * | 7/2019 | Khabiri | G06N 3/006 |
| 2024/0362409 | A1 * | 10/2024 | Kuan | G06F 40/30 |
| 2025/0190449 | A1 * | 6/2025 | Zhang | G06F 16/288 |
| 2025/0217341 | A1 * | 7/2025 | Titus | G06F 16/2237 |

* cited by examiner

*Primary Examiner* — Michelle N Owyang
(74) *Attorney, Agent, or Firm* — Sterne, Kessler, Goldstein & Fox P.L.L.C.

(57) ABSTRACT

A research synthesis platform provides functionality for displaying data related to one or more pieces of content. The research synthesis platform extracts semantically coherent insights from one or more pieces of content using a language processing system, and converts them to vector embeddings. Given a user query, the research synthesis platform searches the insight vector embeddings and other information sources to identify relevant insights, information and source content. The research synthesis platform then retrieves a set of headers, and answers to such headers, from the identified insights, information or source content, to respond to the user query. The research synthesis platform then populates a visual display with the header and answer dataset.

20 Claims, 14 Drawing Sheets

1000

Extract insights and structured metadata from one or more pieces of content and tag source content —— 1002

Convert insights into vector embeddings —— 1004

Cluster the vector embeddings to form a plurality of clusters —— 1006

Generate a series of headers that describes data contained in the clusters —— 1008

Search the vector embeddings and/or other information sources to obtain a series of answers that correspond to the series of headers —— 1010

Populate tables, graphs, or other applicable visual formats using headers generated, and answers sourced from each piece of source content —— 1012

100

CLIENT DEVICE 104

USER INTERFACE 136

USER INPUT ENGINE 138

APPLICATION ENGINE 140

USER QUERY 142

CLIENT MEMORY 144

LANGUAGE PROCESSING SYSTEM (LPS) 106

LANGUAGE MODEL 146A

LANGUAGE MODEL 146N

ADDITIONAL INFORMATION SOURCES 113

CONTENT INFORMATION SOURCES 110

CONTENT 112

CONTENT CURATION PLATFORM 108

INSIGHT-BASED RESEARCH SYNTHESIS PLATFORM 102

DISPLAY ENGINE 135

CLUSTERING ENGINE 118

LPS INTERFACE 124

SEMANTIC SEARCH ENGINE 116

SYNTHESIS ENGINE 122

VECTORIZATION ENGINE 114

INSIGHT GENERATION ENGINE 120

DATA STORE 126

OUTPUTS 137

PROMPT TEMPLATES 134

PROMPTS 130

INSIGHTS 128

CONTENT 132

FIG. 1

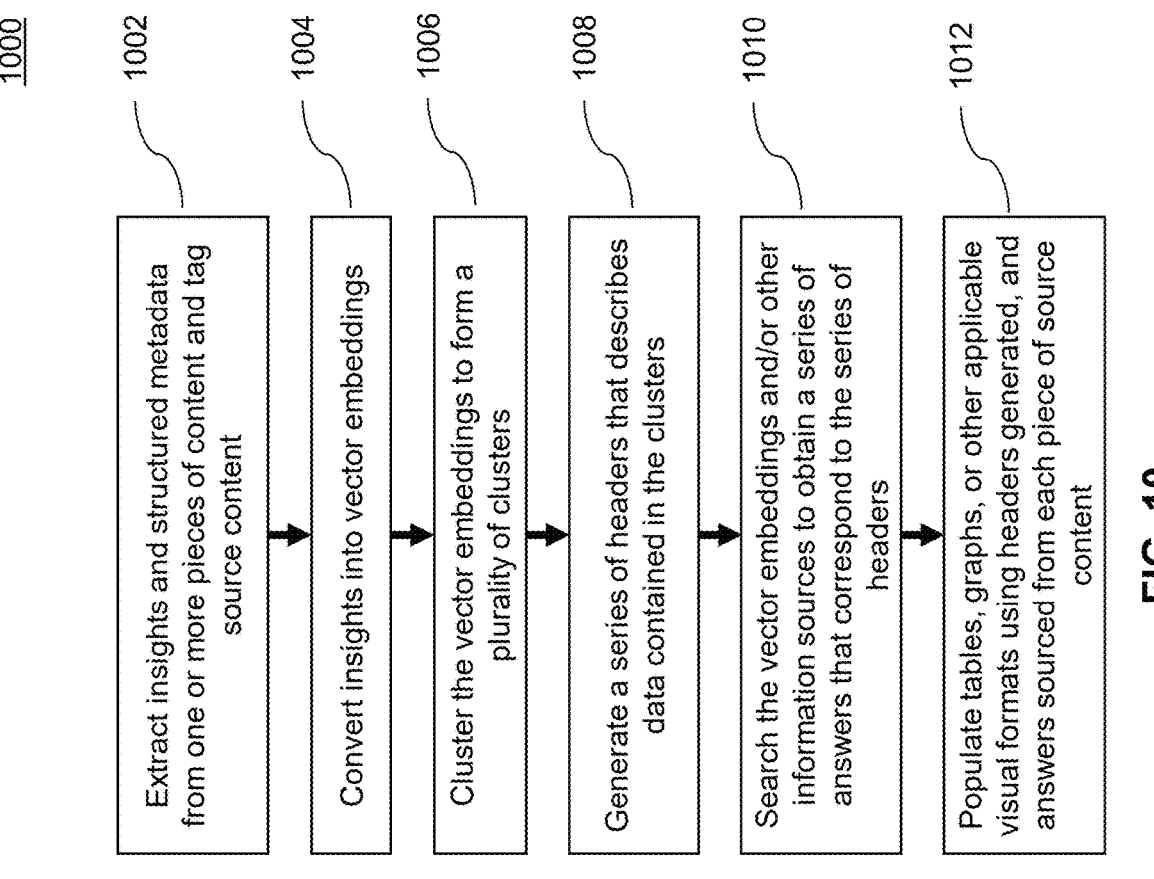

1000

1002 — Extract insights and structured metadata from one or more pieces of content and tag source content 1004 — Convert insights into vector embeddings 1006 — Cluster the vector embeddings to form a plurality of clusters 1008 — Generate a series of headers that describes data contained in the clusters 1010 — Search the vector embeddings and/or other information sources to obtain a series of answers that correspond to the series of headers 1012 — Populate tables, graphs, or other applicable visual formats using headers generated, and answers sourced from each piece of source content

1102 — Extract insights and structured metadata from one or more pieces of content and tag source content 1104 — Convert insights into vector embeddings 1106 — Receive query from user 1108 — Identify insights, source content, metadata and/or other information relevant to the user query 1110 — Generate series of headers 1112 — Generate series of answers corresponding to the series of headers 1114 — Generate visual display using header and answer data structure

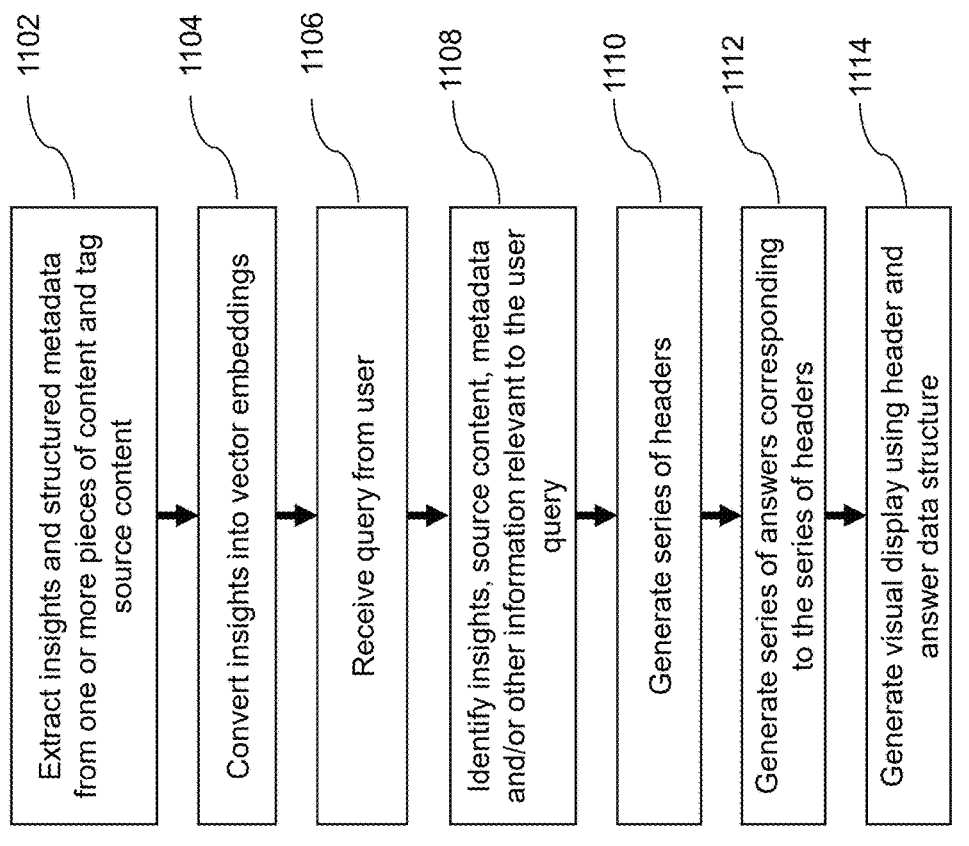

Receive query from user

Extract relevant headers from header list

Generate a query response by extracting answers to the relevant headers from structured data or insights Populate a visual display

EFFICIENT PROCESSING AND DISPLAY OF DATA INSIGHTS

BACKGROUND

Machine learning models have revolutionized various industries by providing various functionalities, such as classification and prediction. A subset of these models-large language models (LLMs)—have recently gained popularity for their ability to perform various natural language processing tasks. These tasks may include content generation, machine translation production, content summarization, and query fulfillment. However, despite their capabilities, conventional LLMs and content processing systems face a variety of technical challenges that limit their practical deployment in real-world systems. These challenges become particularly apparent when dealing with large-scale collections of multimodal content and dynamic information retrieval requirements, such as those required for display of data tables and graphs.

BRIEF DESCRIPTION OF THE DRAWINGS

The accompanying drawings are incorporated herein and form a part of the specification.

FIG. 1 shows an example block diagram of an insight-based research synthesis platform architecture, according to some aspects.

FIG. 10 shows a method for automatically generating header and answer pairs from insights, according to some aspects.

FIG. 11 shows a method for generating a visual display from a user query, according to some aspects.

In the drawings, like reference numbers generally indicate identical or similar elements. Additionally, generally, the left-most digit(s) of a reference number identifies the drawing in which the reference number first appears.

DETAILED DESCRIPTION

Figure 2:
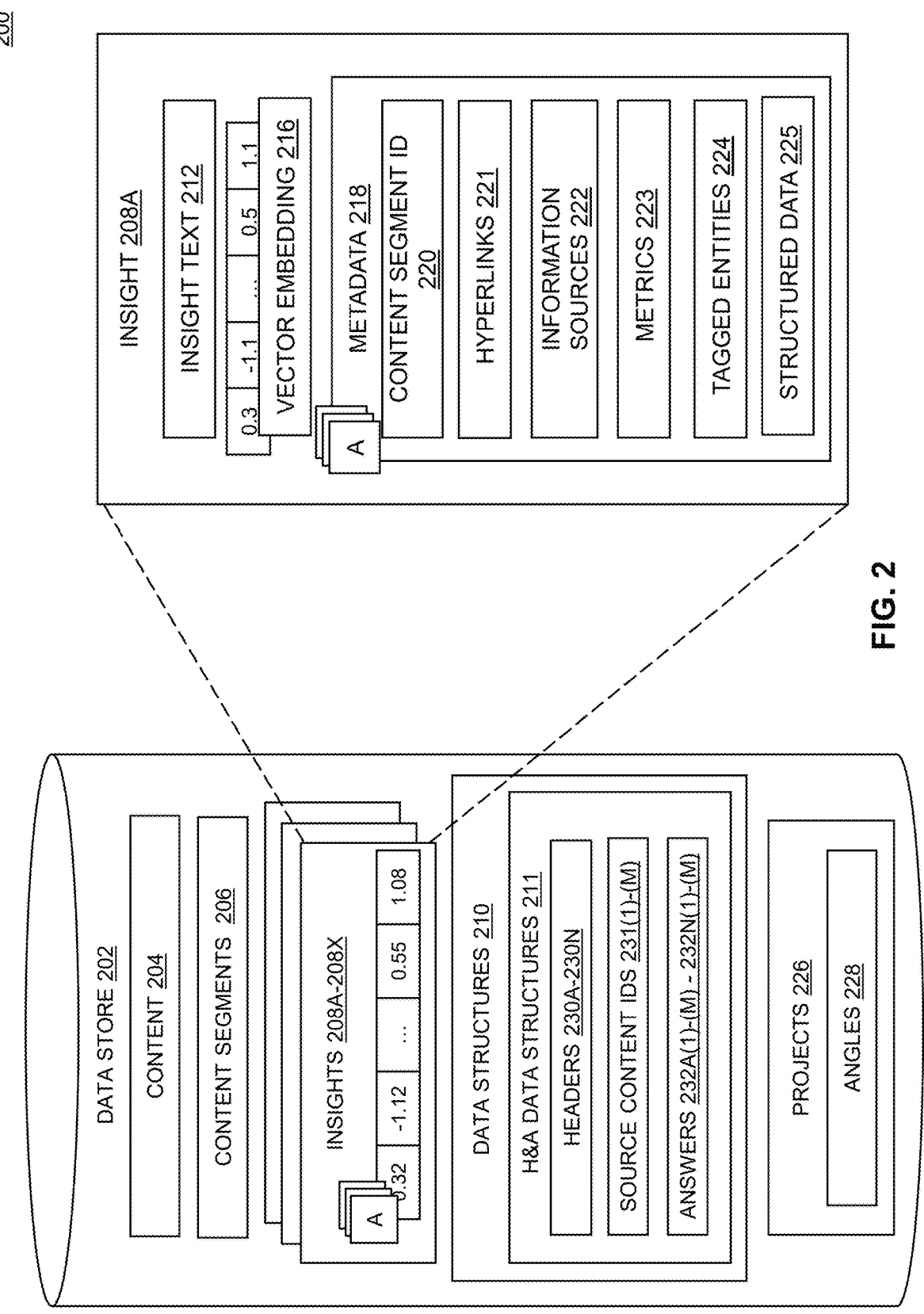
FIG. 2 shows an example block diagram of an insight data structure, according to some aspects.

Disclosed herein are system, apparatus, device, method and/or computer program product aspects, and/or combinations and sub-combinations thereof for implementing an insight-based research synthesis platform, which may leverage artificial intelligence for insight generation and efficient processing and display of multimodal content. Examples of multimodal content may include, but are not limited to, text files, numerical files, pictures, videos, audio files, documents, and the like, as well as one or more portions, sections, or subsections thereof. As a convenience and not a limitation, the present disclosure may be described using the term "content." However, one of ordinary skill in the art will appreciate that the term "content" or "pieces of content" may refer to any type of multimodal content, such as those described above. As used herein, an "insight" may refer to a self-contained and semantically coherent representation of a content segment. The information contained within an insight may also have a higher density of information than its corresponding content segment. The insight-based research synthesis platform may be used to process large quantities of content and efficiently retrieve and display relevant information, for example.

LLMs are one category of machine learning models that have emerged as useful tools for performing processing and analyzing content, offering capabilities such as summarization, information retrieval, and question answering. LLMs may provide a simple natural language interface and access to the large quantities of information on which they are trained, which may range from website content and software code to news articles and electronic books. However, despite these advantages, conventional LLMs and content processing systems suffer from a variety of technical problems that hinder their practical implementation in real-world settings, particularly in the context of handling document collections and dynamic information retrieval systems.

A primary technical challenge in current LLM content processing methods is the practice of repeatedly processing entire pieces of content for each query or analysis task. When new content is added to a data store or when existing content is updated, conventional systems often reprocess complete pieces of content through an LLM. This way, these systems can provide the most up-to-date information when performing retrieval or summarization. However, this repeated processing of entire pieces of content, including portions that are irrelevant for a specific query, results in substantial computational overhead and resource utilization during inference. "Inference" as used herein may refer to the process of running data points through a trained or partially trained machine learning model to generate outputs.

Furthermore, current LLM content processing methods suffer from technical limitations related to context management and information overload. LLMs typically have fixed context windows that limit the amount of input material they can process at once. When entire pieces of content are fed into these models, substantial portions of that limited context may be taken up by extraneous information. This leaves insufficient space for relevant content that could better inform a model's response to a specific query. By nature, LLMs are unable to filter out or skip over this extraneous information during inference. This is because current LLM architectures must process all the provided text or other input material, regardless of its relevance to a query. As a result, LLMs are unable to focus on the most relevant information to complete the task and address specific query requirements.

Additionally, LLMs face technical challenges when processing content in specific contexts. When processing technical content, conventional systems may fail to capture the precise context needed for accurate information retrieval. This limitation becomes particularly apparent in cases where content contains domain-specific terminology, complex relationships (that are not captured or fully explained within the content), or interdependent information that requires consideration of broader context, for example the context under which the content was created.

A further technical challenge faced by conventional LLMs relates to response reliability and accuracy. Even when reference pieces of content are provided during inference, foundation LLM models may generate hallucinations, which may include outputs that are inconsistent with or unsupported by the source content. In these cases, hallucinations may be caused by the statistical nature of LLM training and inference, where language models may blend pre-trained knowledge with content context provided in highly unpredictable ways. Without any reliable mechanisms to check or ensure that the generated responses are grounded within the content provided, systems risk the dangers associated with system inaccuracy and unverifiability. These limitations may then lead to severe consequences in real-world scenarios, where a single inaccuracy or defect can have domino effects leading to poorly informed decision making.

Some systems attempt to address these technical problems through retrieval-augmented generation (RAG) methods, which process documents into smaller chunks to send to an LLM. However, current RAG implementations also face their own set of technical challenges that hinder effective content processing. Conventional chunking methods are typically based on fixed-length divisions (e.g., splitting by every 5000 characters) or simple semantic boundary detection (e.g., splitting by paragraph). However, these strategies fail to preserve coherent units of information that may be necessary for accurate and efficient processing. For example, single chains of reasoning or context may become artificially separated across multiple content chunks. This may result in information gaps and fragmented contexts within and across content chunks.

Some current chunking strategies aim to address this problem by introducing overlaps between consecutive chunks, where subsequent chunks include a small number of characters (e.g., 100-200 characters) from the previous chunk. This strategy allows for some interconnectivity between content chunks and preserves some context that would have been lost. However, this technique does not adequately address the limitations described above, where needed context spans beyond a small number of overlapping characters. This strategy does not capture context required when synthesizing across several separate but related pieces of content, for example. This technique also introduces further technical problems, by requiring additional memory to store the overlapping characters for every single content chunk. In content management systems where there may be millions or billions of pieces of content, the excessive memory usage would be significant.

These technical problems are worsened by the limitations of existing search and retrieval mechanisms. Conventional searching systems often solely rely on keyword matching or semantic similarity measurements to determine the set of content chunks to send to the LLM. However, these systems may fail to identify all of the necessary content chunks for comprehensively addressing a given query. From solely relying on these mechanisms, critical context may be missing from the retrieved sets of content chunks, and the LLM would generate an incomplete and/or factually incorrect response as a result. These information gaps are further widened when systems start working with complex queries that require understanding relationships across multiple sections of content or across different pieces of content.

Aspects of the disclosure herein solve these technological problems by implementing an insight-based research synthesis platform. An "insight" as used herein may refer to a self-contained and semantically coherent representation of a content segment. The information contained within an insight may be of higher density than the information contained within its associated content segment. The information contained within an insight may partially be encapsulated in a text passage, or a record in another modality, (hereafter "insight text"), generated from the associated content segment, and optionally other content. For example, an insight text may have all extraneous or unnecessary information removed from the corresponding content segment, or an insight text may have any required or helpful context from other content segments or content inserted. The information contained within an insight may additionally be enriched and partially encapsulated in structured or unstructured metadata extracted from content, content segments, or additional information sources accessed by the insight-based research synthesis platform ("metadata"). Metadata may further increase the information density of the insight, aid in insight retrieval, and assist visualization of insight information in downstream outputs.

The insight-based research synthesis platform may be used to process large quantities of content and retrieve relevant information, for example. In some aspects, the insight-based research synthesis platform can first process content into insights and store the insights inside a central data store. The insight-based research synthesis platform may then perform various tasks relating to the content by using the insights rather than the pieces of content themselves. These tasks may include, but are not limited to, synthesis, summarization, information retrieval, information visualization, text classification, text translation, information analysis, information tabulation, graphing, quote selection, and comparisons. The insight-based research synthesis platform may include various input modes and model modalities including, but not limited to, multimodal machine learning models, large language models, data models, statistical models, audio models, visual models, and audiovisual models. The insight-based research synthesis platform may also support simplified human-computer interactions via a natural language interface including adaptable forms of input including, but not limited to, numerical data, text, audio, images, and more.

In some aspects, the insight-based research synthesis platform may provide functionality for displaying data related to one or more pieces of content, for example, via artificial intelligence. The insight-based research synthesis platform may partition a piece of content into a plurality of content segments. A piece of content may be any of the example multimodal content discussed above, including, but not limited to, an entire document or one or more portions, sections, or subsections thereof. The insight-based research synthesis platform may then contextualize a content segment from the content segments to form an insight. In some aspects, contextualizing a content segment to form an insight may involve querying a language processing system using additional content segments different from the content segment for which an insight is being formed (e.g., to generate a context-rich, atomic piece of information containing a higher density of information than the original content segment). In some aspects, contextualizing the content segment may also involve including information from other additional information sources and data models (e.g., proprietary and/or third party models) in the insight. The insight-based research synthesis platform may then generate a vector embedding for the insight. The insight-based research synthesis platform may then determine that the vector embedding is relevant to a certain task. The insight-based research synthesis platform may then query, based on the determining, a language processing system having one or more language models, or another data-processing model, to perform the task using the insight alone, or in connection with other insights, associated pieces of content, or information.

In some aspects, the insight-based research synthesis platform may provide functionality for displaying data in a visual format, such as a table, list, ranked list, categorized list, graph, line chart, pie chart, bar chart, scatter plot, histogram, distribution, key metric overview, process flow diagram, word map, graphical map, network diagram or the like. In some aspects, the insight-based research synthesis platform may generate structured data corresponding to insights generated from a plurality of pieces of content. The generating may involve querying a language processing system using content segments. The insight based research synthesis platform may then leverage semantic search to generate an answer to a user query using vector embeddings of the user query, and the structured data. The insight-based research synthesis platform may then display the user query and answer in a visual format, such as a table, graph, bar chart, pie chart, or the like.

These approaches provide direct technological improvements over previous systems via an implementation that indexes information in content into self-contained atomic insights that preserve semantic meaning and context. These approaches allow for more efficient and effective querying of language models by restricting model inputs to a curated and condensed set of relevant insights, rather than relying on the LLM to process and organize entire pieces of content or content sections. Furthermore, because these insights contain less extraneous information and/or additional helpful context, the output quality from querying the language models is increased.

The techniques described herein also improve the functioning of a computing system. Insights can provide for improved and faster querying and output generation by generative artificial intelligence systems, including for outputting data in a visual format, such as a table or graph. In previous implementations, an LLM or other language model would require extensive compute resources and time to tokenize and respond to content-processing queries using entire pieces of content or content sections. In particular, extensive compute resources and time would be dedicated for content sections that were not pertinent to a given query. Furthermore, inputs from these implementations would contain information gaps and fragmented context that led to incomplete LLM responses. Additionally, RAG implementations using chunk overlapping techniques to address context gaps do not benefit from external information which may be used to enrich insights, and may require additional memory resources to store the overlapping chunks.

By contrast, the aspects described herein may preprocess those pieces of content or content sections into various insights to efficiently and accurately respond to those same queries. This saves the computational time and resources that would otherwise have been expended during inference to formulate responses to client queries using entire pieces of content or content sections. Additionally, this saves memory resources that would have been required to store the overlapping sections across all content chunks. This also saves the computational time and resources that would have been expended to re-perform any inference or additional processing to address any response inaccuracies or incompleteness caused by context gaps. Furthermore, while the conservation of computational and memory resources may be limited with respect to a single client device, the total conservation of computational and memory resources across an entire fleet of client devices may be significant.

These technical advantages may be appreciated, for example, in resource-constrained environments and large-scale document or content management systems. The overall computational efficiency of these systems may be improved as a result and the conserved resources may be reallocated for other tasks. Additionally, the context-rich and self-contained nature of insights may translate to fewer computational errors and higher performance accuracy.

Various aspects of this disclosure may be implemented using and/or may be a part of the example insight-based research synthesis platform shown in FIG. 1. It is noted, however, that these environments are provided solely for illustrative purposes, and are not limiting. Aspects of this disclosure may be implemented using and/or may be part of environments different from and/or in addition to the insight-based research synthesis platform, as will be appreciated by persons skilled in the relevant art(s) based on the teachings contained herein.

An example of the insight-based research synthesis platform shall now be described.

FIG. 1 shows an example block diagram of an insight-based research synthesis platform architecture 100, according to some aspects. Operations described may be implemented by processing logic that may comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 1, as will be understood by a person of ordinary skill in the art.

Example insight-based research synthesis platform architecture 100 may include an insight-based research synthesis platform 102, a client device 104, a language processing system (LPS) 106, a content curation platform 108, content information sources 110, content 112, and additional information sources 113. In some aspects, example insight-based research synthesis platform architecture 100 may be implemented partially or entirely at client device 104. Alternatively or additionally, in some aspects, example architecture 100 may be implemented partially or entirely at third party servers or within the cloud. In such aspects, client device 104, insight-based research synthesis platform 102, language processing system 106, and content curation platform 108 may be communicatively coupled with each other via one or more networks, such as one or more wired or wireless local area networks ("LANs," including Wi-Fi, mesh networks, Bluetooth, near-field communication, etc.) or wide area networks ("WANs," including the Internet, cellular networks, etc.).

In some aspects, insight-based research synthesis platform 102 may include a vectorization engine 114, a semantic search engine 116, a clustering engine 118, an insight generation engine 120, a synthesis engine 122, an LPS interface 124, and a data store 126. In some aspects, insight-based research synthesis platform 102 may be implemented as one or more servers and/or one or more cloud servers. Insight-based research synthesis platform 102 may also be implemented as a variety of centralized or decentralized computing devices. For example, insight-based research synthesis platform 102 may operate on a mobile device, a laptop computer, a desktop computer, grid-computing resources, a virtualized computing resource, cloud computing resources, peer-to-peer distributed computing devices, a server farm, or a combination thereof. Insight-based research synthesis platform 102 may be centralized in a single device, distributed across multiple devices within a cloud network, distributed across different geographic locations, or embedded within a network. In some aspects, insight-based research synthesis platform 102 may receive pieces of content 112 curated by content curation platform 108. In some aspects, content curation platform 108 may interface with content information sources 110 to obtain content 112. For example, content information sources 110 may include subject matter experts that contribute their knowledge to content 112, and proprietary data models including but not limited to knowledge on companies, markets, customers, competitors, and more. As a few non-limiting examples, content 112 may include call or meeting transcripts, such as transcripts of discussions with subject matter experts and/or other content information sources 110. In some aspects, insight-based research synthesis platform 102 may query information from enriching additional information sources 113 to increase the information associated with insights 128 or content 132.

In some aspects, data store 126 may store various data used by insight-based research synthesis platform 102, including insights 128, content 132, prompt templates 134, outputs 137 and metadata and enriching information associated with these entities. For example, data store 126 may store content 112 received from content curation platform 108 as content 132. Data store 126 may be stored, for example, in a volatile memory (e.g., random access memory (RAM)), a non-volatile storage device (e.g., a disk), or in a distributed and/or redundant manner across multiple memories and/or storage devices. In some aspects, data store 126 is managed by and accessed via a corresponding database management system (DBMS), which is not shown in FIG. 1 for the sake of simplicity. Data store 126 and the corresponding DBMS may be implemented on one or more computer systems, such as computer system 1300 as described below in reference to FIG. 13. Data store 126 and the corresponding DBMS may also be implemented on one or more servers of an enterprise network and/or a cloud computing network.

As described above, insights 128 may be self-contained and semantically coherent representations of content segments. The "self-contained" property may indicate that insights 128 are each complete and independently interpretable without requiring any external references, dependencies, or context. As such, insights 128 may also each be interpreted as an atomic, standalone unit of information represented in a content segment. The "semantically coherent" property may indicate that insights 128 are each logically consistent and convey meaningful concepts or ideas. As a result, insights 128 may each contain information of a higher density than their respective content segment, represented both in their associated insight text and/or in other associated metadata. For example, extraneous or unnecessary information may be removed from a content segment during the formation of an insight text, so that the corresponding insight information is of higher specificity and concision. An insight text may also be enriched with required or helpful context from other content segments or other content. An insight text may also consolidate the information from the content segment. In addition to insight texts, insights 128 may also contain enriching structured metadata extracted from content, content segments, or additional information sources 113 accessed by the insight based research synthesis platform. Metadata can be leveraged by insight-based research synthesis platform 102, which will be described in further detail below with respect to FIG. 2.

Language processing system (LPS) 106 may be a distributed computing system configured to execute one or more natural language machine learning models, such as language models 146A-146N (collectively, "language models 146"). In some aspects, language models 146 may be transformer and/or neural network based language models trained on large amounts of textual data (e.g., LLMs). Language models 146 may employ various model architectures including, but not limited to, encoder-decoder, causal decoder, and prefix decoder architectures. Examples of natural language models may include Google Gemini 1.5 Pro, OpenAI GPT-4 or GPT-4o, and Anthropic Claude 3.5. Various components of insight-based research synthesis platform 102 may leverage LPS interface 124 to communicate with LPS 106 and language models 146 to perform various tasks, such as responding to user queries across modalities (e.g., user query 142), partitioning content, generating insights, processing data for display in visual formats (including as non-limiting examples, tables, lists, ranked lists, categorized lists, graphs, line charts, pie charts, bar charts, scatter plots, histograms, distributions, key metric overviews, process flow diagrams, word maps, graphical maps, or network diagrams), retrieving information, and more.

Generally, prompts 130 may refer to unimodal or multimodal natural language instructions or computer code that is fed into a language processing system (e.g., LPS 106). Prompts 130 may include contexts, user instructions, system instructions, and/or other metadata for guiding LPS 106 towards generating a desired output. Prompts 130 may come in many different forms and have various different applications. For example, prompts 130 may define functionality for partitioning a piece of content, generating a data structure for displaying one or more pieces of content in a visual format, retrieving information, and responding to user queries (e.g., user query 142).

Prompt templates 134 may define certain structures for prompts 130 to follow before prompts 130 are submitted to LPS 106. Prompt templates 134 may leverage predefined configurations or optimizations for obtaining more accurate and higher quality responses by LPS 106. For example, prompt templates 134 may provide additional context for a task and specific rules or guidelines to follow during inference. Prompt templates 134 may also define how user queries (e.g., user query 142) and/or insight texts are incorporated into prompts 130. For example, a prompt template may include various placeholders where different portions of user query 142 and/or insight texts may be inserted.

Insight generation engine 120 may generate insights 128 from partitioned content segments. Insight generation engine 120 may partition content 112 into corresponding content segments that may be used for generating insights 128. In some aspects, insight generation engine 120 may employ LPS interface 124 to obtain content segments for a piece of content. Insight generation engine 120 may aim to identify a set of content segments where each content segment captures a single idea or concept. To accomplish this, insight generation engine 120 may first construct a prompt (e.g., prompts 130) using prompt templates 134. Insight generation engine 120 may then employ LPS interface 124 to query LPS 106 using the constructed prompt to obtain content segments for a piece of content. In some aspects, insight generation engine 120 may receive segment boundaries for the piece of content from LPS 106. In such aspects, insight generation engine 120 may then determine the content segments using the segment boundaries. In some aspects, insight generation engine 120 may receive the content segments from LPS 106. In any case, the content segments may, in aggregate, constitute or "sum up to" the corresponding piece of content. In constructing a response, LPS 106 may employ various techniques including, but not limited to multi-head self-attention mechanisms, positional encoding, layer normalization, masked autoregressive decoding nucleus sampling, Softmax token distribution computation, and key-value cache optimization.

Alternatively or additionally, insight generation engine 120 may employ a naïve chunking strategy to obtain content segments. For example, insight generation engine 120 may obtain one or more content segments from content 112 or content 132 by splitting by a predetermined amount of characters (e.g., splitting every 4000 characters). Insight generation engine 120 may also employ a stochastic naïve chunking strategy that splits content 112 or content 132 by a random number of characters.

In some aspects, insight generation engine 120 may generate insight texts for insights 128 corresponding to one or more content segments (e.g., content segments obtained by insight generation engine 120). In some aspects, insight generation engine 120 may formulate prompts 130 to generate insight texts for insights 128, through LPS interface 124. In some aspects, insight generation engine 120, for a content segment for which an insight text is being generated, may wrap that content segment along with additional context (e.g., from other content segments from the piece of content, from the entire piece of content, from related content, from additional information sources etc.) inside a prompt template (e.g., prompt templates 134). Insight generation engine 120 may then employ LPS interface 124 to query LPS 106 using the constructed prompt to generate an insight text for the content segment.

In some aspects, the query to LPS 106 may include instructions to exclude unnecessary information from the content segment when generating the insight text. Alternatively or additionally, the query to LPS 106 may also include instructions to insert information contained within additional context (e.g., from other content segments from the piece of content, from the entire piece of content, from related content, from additional information sources etc.) that would enrich the current idea or concept inside the content segment. In some aspects, the query to LPS 106 may also include context from additional information sources 113, including other data sources and data models (e.g., proprietary and/or third party models), to enrich the idea or concept inside the content segment when generating the insight text. As a result, the generated insight text may possess a higher density of information compared to its corresponding content segment. In some aspects, the query to LPS 106 may also specify a granularity or level of granularity for the generated insight text.

In some aspects, insight generation engine 120 may also generate or identify and associate structured or unstructured metadata with insights 128, for example, to further contextualize insights 128 and aid in data retrieval and verifiability. In some aspects, insight generation engine 120 may enrich insights 128 with additional structured metadata extracted from content or content segments, for example various metrics and entities discussed within the content or content segment. In some aspects, insight generation engine 120 may identify entities contained within a content segment or insight, describe those entities with identifiers, and then use the identifiers to associate information derived from other additional information sources 113 with the insight (e.g., structured or unstructured data from proprietary and/or third party models).

In some aspects, insight generation engine 120 may generate a segment identifier for an insight that links the insight to its corresponding content segment. Insight generation engine 120 may also generate one or more hyperlinks, for example, to the content, the content segment, or related content (e.g., content related to identified entities), and associate these with the insight. The various metadata for insights 128 may be described in further detail with respect to FIG. 2.

Semantic search engine 116 may retrieve structured or unstructured data within insight-based research synthesis platform 102, relating to one or multiple pieces of content 132. In some aspects, semantic search engine 116 may employ various search and retrieval methods to obtain records from data store 126. For example, semantic search engine 116 may first analyze a query (e.g., user query 142) to determine a relevant insight from among insights 128 in data store 126. In some aspects, semantic search engine 116 may perform classification on user query 142 and/or extract search parameters from user query 142. For example, semantic search engine 116 may employ a different retrieval technique based on a specific classification result. In unstructured text retrieval contexts (e.g., insight texts), semantic search engine 116 may employ techniques including, but not limited to, Boolean search techniques via TF-IDF scoring, semantic search, keyword search, hybrid retrieval techniques, and cross-encoder re-ranking strategies. For structured search and retrieval contexts, semantic search engine 116 may employ various techniques including, but not limited to, field-specific matching, numerical range queries, faceted search, and fuzzy search. Ultimately, the techniques relied upon by semantic search engine 116 may depend on how records in data store 126 are formatted. With respect to insights 128, corresponding insight texts, and additional enriching information, a few possible implementations are contemplated and discussed hereafter in FIGS. 2-3; however, those implementations are not meant to be limiting.

Vectorization engine 114 may convert each of insights 128 into insight embeddings, which represent condensed, numerical forms that can help efficiently differentiate between various data records, such as insights 128. For example, vectorization engine 114 may leverage techniques including word2vec, GloVe, or transformer-based models to generate dense vector representations for words or phrases in insights 128. In doing so, vectorization engine 114 may capture semantic relationships and contextual information within insights 128 into a format that can be searched and processed by insight-based research synthesis platform 102. In some aspects, semantic search engine 116 may leverage these insight embeddings to identify relevant insights. For example, when tasked with identifying a relevant insight for user query 142, semantic search engine 116 may first generate an embedding of user query 142. Semantic search engine 116 may then perform similarity searches (e.g., k-nearest neighbors, approximate nearest neighbors, locality-sensitive hashing, etc.) between the insight embeddings and the embedding of user query 142 to identify the set of insights that are most similar to a question or task specified in user query 142. This may allow semantic search engine 116 to leverage the structural properties of the vector space to retrieve relevant insights, especially in cases when the relevant insights do not observe surface-level similarities with the question or task specified in user query 142 (e.g., having the same keywords).

Clustering engine 118 may perform clustering on various data within insight-based research synthesis platform 102. For example, clustering engine 118 may perform clustering on insight embeddings corresponding to a subset of insights 128, such as the insights for one or multiple pieces of content. Clustering engine 118 may employ various clustering strategies and techniques, such as, but not limited to, hierarchical clustering (e.g., agglomerative clustering, divisive clustering, etc.), density-based clustering (e.g., DBSCAN, OPTICS, etc.), partitioning clustering (e.g., k-means clustering, k-medoids clustering, etc.), or model-based clustering (e.g., Gaussian mixture models, Dirichlet process mixtures, etc.). By grouping similar insights together, clustering engine 118 can help identify patterns, relationships, and underlying structures in the data.

Synthesis engine 122 may perform various generation functionalities across insight-based research synthesis platform 102, to produce outputs 137. Alternatively or additionally, synthesis engine 122 may also assist insight-based research synthesis platform 102 in performing tasks associated with content. Outputs 137 may include any items produced by synthesis engine 122 and/or insight-based research synthesis platform 102.

Given a query, synthesis engine 122 may generate data structures, including header and answer data structures as a non-limiting example, from insights 128 (including associated insight texts, metadata, and content segments), content 132, or outputs 137. Data structures may be stored in data store 126, as one non-limiting example of outputs 137.

In some aspects, insight-based research synthesis platform 102 may first receive user query 142 from client device 104 and forward user query 142 to synthesis engine 122. Alternatively or additionally, insight-based research synthesis platform 102 may identify a query from an existing query bank within data store 126, or by extracting a theme from clusters of insights 128 (including associated insight texts, metadata, and content segments), content 132, or outputs 137, leveraging clustering engine 118 and language processing system 106. Having received or identified a query, insight-based research synthesis platform 102 may then decompose the query into sub-queries, capturing the full intention of the initial query in more granular and specific detail.

Given a query and/or associated sub-queries, insight-based research synthesis platform 102 may generate a sourced query result. First, semantic search engine 116, and/or language processing system (LPS) 106 may identify insights 128 (including associated insight texts, metadata, and content segments), content 132, or outputs 137 relevant to the query and/or associated sub-queries, from one or multiple pieces of content. Synthesis engine 122 may then formulate prompts 130 to generate data structures, including header and answer data structures, from relevant information identified, in context of the query or sub-queries. In some aspects, synthesis engine 122 may wrap identified insight texts, metadata, content segments, content 132, or outputs 137, or sections thereof, inside a prompt template (e.g., prompt templates 134). Synthesis engine 122 may then employ LPS interface 124 to query LPS 106 using the constructed prompt to generate data structures, including header and answer data structures as a non-limiting example. In some aspects, the sourced query result data structures may include hyperlinks to relevant content segments, or hyperlinks to entire relevant pieces of content. In some aspects, outputs 137 generated by synthesis engine 122 may be recorded within data store 126. In some aspects, model outputs 137 may become inputs to further prompt chains or algorithms producing further outputs 137.

In some aspects, insight-based research synthesis platform 102 includes a visual display engine 135. Display engine 135 may generate visual displays using data structures generated by insight-based research synthesis platform 102, including header and answer data structures, as described above. For example, display engine 135 may extract and plot data points contained within the data structures in a graphical or tabular format. Graphical or tabular formats may include tables, graphs, bar charts, pie charts, and the like. For example, numerical data structures may be presented in a graph. As another example, header and answer data structures that may span text-based, numerical, and/or graphical information sourced across multiple pieces of content may be presented in a table. Display engine 135 may include hyperlinks to content segments or pieces of content in visual displays.

Client device 104 may be one or more of a desktop computer, a laptop computer, a tablet, a mobile phone, a smart appliance such as a smart television, and/or a wearable apparatus of the user that includes a computing device (e.g., a smartwatch, smart glasses, or a virtual or augmented reality computing device). Additional and/or alternative client devices are within the scope of this disclosure. Client device 104 may include a corresponding user interface 136, user input engine 138, application engine 140, user query 142, and client memory 144.

User interface 136 may be configured to render content including unimodal responses, multimodal responses, or other content for audible or visual presentation to a user of client device 104 using one or more user interface output devices. For example, client device 104 may include a display or projector that enables content to be provided for visual presentation to a user via client device 104. Alternatively or additionally, client device 104 may include one or more speakers that enable content to be provided for audible presentation to a user via client device 104.

User input engine 138 may detect user input provided by a user of client device 104 using one or more user interface input devices. For example, client device 104 may include one or more microphones that capture audio data, such as audio data corresponding to spoken utterances of the user or other sounds in an environment surrounding client device 104. Alternatively or additionally, client device 104 may include one or more vision components (e.g., a camera) that may capture vision data corresponding to images and/or movements (e.g., gestures) detected in a field of view of one or more of the vision components. Alternatively or additionally, client device 104 may include one or more touch sensitive components including, but not limited to, a keyboard and mouse, a stylus, a touch screen, a touch panel, and physical buttons configured to capture signals corresponding to touch input directed towards client device 104.

Application engine 140 may execute one or more software applications on client device 104. In some aspects, application engine 140 may submit a natural language query (e.g., user query 142) to insight-based research synthesis platform 102. Application engine 140 may then receive unimodal, multimodal, or other responses from insight-based research synthesis platform 102 in response to a natural language query, which may then be rendered onto user interface 136 (e.g., audibly and/or visually). Application engine 140 may execute one or more software applications that are separate from an operating system of the client device 104 or may alternatively be implemented directly by the operating system of client device 104. For example, the application engine 140 may execute one or more software applications via a web browser or assistant.

User query 142 may represent an input provided by a user of client device 104 and may be detected via user input engine 138. For example, user query 142 may include a question or task by a user regarding content 132 or a subset of content 132, such as asking for specific information or summarizing information. In some aspects, user query 142 may be specify one or more search parameters to obtain relevant content from content 132 (e.g., one or more keywords, boolean operators, content type, etc.). In some aspects, user query 142 may be a typed query that is typed via a physical or virtual keyboard, a suggested query that is selected via a touch screen or a mouse of client device 104, a spoken voice query that is detected via a microphone of client device 104 (or directed to an voice assistant running at client device 104), or an image or video query that is based on vision data captured by a vision component of client device 104.

In some aspects, user query 142 may be converted to a natural language based input or a multimodal input to be submitted to insight-based research synthesis platform 102. Alternatively or in addition, user query 142 may be sourced via image processing techniques utilizing, for example, object detection models, captioning models, or the like. In some aspects, user query 142 may be a prompt for content that is formulated based on user input provided by a user of client device 104 and detected via user input engine 138. For example, the prompt can be a typed prompt that is typed via a physical or virtual keyboard, a suggested prompt that is selected via a touch screen or a mouse of client device 104, a spoken prompt that is detected via a microphone of client device 104, or an image or video prompt based on data captured by a vision component of client device 104.

Client memory 144 may include a data store containing data about a user of client device 104 or about client device 104 itself. In some aspects, client memory 144 may store one or more queries (e.g., user query 142) made by a user of client device 104. Client memory 144 may also store a context of client device 104. As just one example, client memory 144 may store conversation data by a user with insight-based research synthesis platform 102. Client memory 144 may also store user interaction data about current or recent interactions between a user or multiple users and client device 104. In some aspects, client memory 144 may also store location data about current or recent locations of client device 104 or a geographical region associated with a user of client device 104. Client memory 144 may also store user attribute data, user preference data, a user profile, or various configurations relating to client device 104 or a user of client device 104. In some aspects, the data stored in client memory 144 may be communicated partially or entirely to insight-based research synthesis platform 102 (e.g., to produce higher quality outputs).

FIG. 2 shows an example block diagram of a system 200 of an insight data structure, according to some aspects. Operations described may be implemented by processing logic that may comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 2, as will be understood by a person of ordinary skill in the art. System 200 shall be described with reference to FIG. 1. However, system 200 is not limited to those example aspects.

As shown in FIG. 2, system 200 may include a data store 202. In some aspects, data store 202 may be an example of data store 126 (of FIG. 1). Data store 202 may include content 204, content segments 206, insights 208A-208X, and data structures 210. Content 204 may be an example of content 132. Insights 208A-208X may be an example of insights 128. Insights 208A-208X may include insight 208A, which may include insight text 212, vector embedding 216, and metadata 218. Data structures 210 may be an example of output 137.

Similar to the discussion above, data store 202 may store various data used by an insight-based research synthesis platform (e.g., insight-based research synthesis platform 102. Data store 202 may store various pieces of content received from a content curation platform (e.g., content curation platform 108) as content 204. In some embodiments, data store 202 may also store content segments 206 generated from content 204 via an insight generation engine (e.g., insight generation engine 120). Content segments 206 may, in aggregate, constitute or "sum up to" the corresponding content. In some aspects, content segments 206 may be content chunks similar to those used in RAG approaches. Content segments 206 may include less overlapping characters between chunks as compared with conventional chunking strategies (e.g., little or no overlap).

Also similar to the discussion above, insights 208A-208X may be self-contained and semantically coherent representations of content segments. In some aspects, an insight 208A may contain an insight text 212 that semantically represents a corresponding content segment. An insight text 212 for an insight 208A may be represented in text form. Alternatively or additionally, an insight text 212 may include additional modalities other than text. For example, information in an insight text 212 may also be represented as an image, video, or audio file, which may be used for querying one or more multimodal models. Insight text 212 may include additional helpful context for interpreting the information within its corresponding content segment. For example, this additional helpful context may be information that was originally missing from the corresponding content segment. In some cases, this missing context could be detrimental to information retrieval and content management systems. In some embodiments, insight text 212 may also consolidate or summarize the salient points set forth in its corresponding content segment. In this process, insight text 212 may exclude unimportant or filler text from the corresponding content segment. Insight text 212 may also present the information in a more compact and concise manner. As a result of the above process, insight text 212 may contain a higher density of information than its corresponding content segment.

In addition to insight text 212, insight 208A may contain or be associated with metadata 218 that can be leveraged by an insight-based research synthesis platform (e.g., insight-based research synthesis platform 102). Metadata 218 may include data that is used in common searches or utilized in further analysis. For example, metadata 218 may include metrics 223, tagged entities 224, or other structured data 225 (e.g., numerical values, company competitors, product segments, customer segments, regions, company entities, key purchasing criteria, performance metrics), TRUE/FALSE statements, and the like. Tagged entities 224 (e.g., company, market, region, industry, etc.) may allow a system (e.g., insight-based research synthesis platform 102) to quickly search and query the data contained within insight 208A. In some aspects, the tagged entities are associated with one or more performance metrics, trends, or other data points.

Metadata 218 may be generated or assigned by a synthesis engine (e.g., synthesis engine 122). For example, synthesis engine 122 may generate a prompt for LPS 106 to extract structured data 225. The prompt may contain a list of possible data categories and tags that are commonly of interest in market analysis (e.g., numerical values, performance metrics, product segments, customer segments, etc.). Synthesis engine 122 may then employ LPS interface 124 with the constructed prompt to obtain the structured data 225. Synthesis engine 122 may then assign the structured data 225 to insight 208A.

In some aspects, synthesis engine 122 may consult an entity data model to determine whether an extracted entity obtained from LPS 106 is a taggable entity within insight-based research platform 102 and the relationships among and between them. Synthesis engine 122 may repeat this querying process one or more times to ensure a threshold amount of tagged entities 224 and associated metrics 223 are properly extracted and assigned. Alternatively or additionally, tagged entities 224 and metrics 223 may be obtained by a separate extraction engine (not shown in FIG. 1). This extraction engine may employ various named entity recognition and metric identification techniques to obtain and assign tagged entities 224 and metrics 223 to insight 208A within metadata 218.

Insight 208A may further include a vector embedding (e.g., vector embedding 216) that numerically represents a corresponding content segment. For example, vector embedding 216 may be a vector representation of insight text 212 obtained via a vectorization engine (e.g., vectorization engine 114). In some aspects, vector embedding 216 may be a sparse or dense vector representation of floating point values. Looking to FIG. 2, an example of vector embedding 216 may be (0.32, −1.12, . . . , 0.55, 1.08). Each column of vector embedding 216 may represent a value of a feature for the vector embedding model employed by insight-based research synthesis platform 102. For example, each feature may be a normalized token count or a feature in a multidimensional latent space for content 204. By having a specific combination of feature values, vector embedding 216 may numerically represent the information contained within insight 208A and its corresponding content segment. This also allows insight-based research platform 102 to quickly compare vector embedding 216 with other vector embeddings (e.g., ones corresponding to insights 208(B)-(X)) using similarity comparison techniques (e.g., Euclidean distance, Manhattan distance, Minkowski distance, Chebyshev distance, cosine similarity, approximate nearest neighbors, contextual distance, etc.).

Metadata 218 may store additional structured data that can be leveraged by insight-based research synthesis platform 102. Metadata 218 may include a content segment ID 220 that links insight 208A with its corresponding content segment. In some aspects, content segment ID 220 may also serve as the main identifier for linking insight 208A with all associated data (e.g., insight text 212, metadata 218, vector embedding 216, an information source 222, the corresponding content segment(s), the corresponding pieces of content etc.). Content segment ID 220 may be generated, for example, by an insight generation engine (e.g., insight generation engine 120). Content segment ID 220 may then be used to track when insight 208A is determined as a relevant insight for a content related task or sent to a language processing model (e.g., LPS 106). In such cases, insight-based research synthesis platform 102 may leverage content segment ID 220 to obtain the content segment corresponding to insight 208A (e.g., via a query to data store 202) for displaying the content segment or an excerpt thereof within a query response.

Metadata 218 may also include an information source 222 that may represent any source of information from which content 204 may be obtained. In some aspects, information source 222 may represent the source of information from which the content corresponding to insight 208A was obtained. For example, information source 222 may be one or more subject matter experts that contributed their knowledge to the content corresponding to insight 208A. Alternatively or additionally, information source 222 may specifically represent a source of information that contributed specifically to the content segment corresponding to insight 208A. This may be useful in cases when, for example, more than one sources of information contributes to a piece of content. As one technical improvement over conventional systems, this granular approach may conserve any wasted memory resources utilized for redundant or unnecessary information source assignments across content segments. As a few non-limiting examples, the information within content 204 may include information about specific companies, markets, customers, competitors, any relationships thereof, and more.

In some aspects, data store 202 may contain projects 226. Projects 226 may reference content 204, content segments 206, and/or insights 208A-208X for analysis of a research topic defined by a user. Each project 226 may include one or more angles 228 that further categorize analysis of the research topic. For example, a project may be directed to company A, while an angle may be directed to the competitors of company A. Other non-limiting examples of angles 228 include customers, regulators, suppliers, employees, executives, markets, competitors, intermediaries, financial information and/or business metrics, etc.

Data structures 210 may contain data structures created by synthesis engine 122, from a subset of insights 208A-208X identified by semantic search engine 116 in response to a user query (for example, user query 142 received via client device 104), or from subsets of insights 208A-208X clustered by clustering engine 118 in the context of a project 226 or angle 228, as non-limiting examples. In some aspects, data structures 210 may take the form of header and answer data structures 211 ("H&A data structures"), comprising headers 230A-230N, source content IDs 231(1)-(M), and answers 232A(1)-(M), 232B(1)-(M), . . . , 232N(1)-(M), whereby answer 232N(M) is the answer responding to header 230N sourced from source content ID 231(M). For example, a set of headers may relate to the market shares of companies in the oil and gas industry (company A, company B, and company C), and answers to each of those three headers may be sourced from relevant insights identified from two market reports (report X, and report Y), generating six potential answers. Headers 230A-230N may be designed to be answered using numbers, binary indicators, or short phrases. This may allow headers 230A-230N and their corresponding answers to be displayed as a table or graph, as described in more detail below in FIGS. 7, 8, and 9. Headers 230A-230N may be predefined, drawn from a existing list, or automatically generated based on data contained within identified subsets of insights 208A-208X, as described in more detail below in reference to FIG. 4 and FIG. 5. The example data structure described above is not meant to be limiting nor meant to represent an exhaustive list of possible implementations. The scope of the technology disclosed herein is not limited to only these examples, and other implementations are contemplated as appreciated by one skilled in the art.

Figure 3:
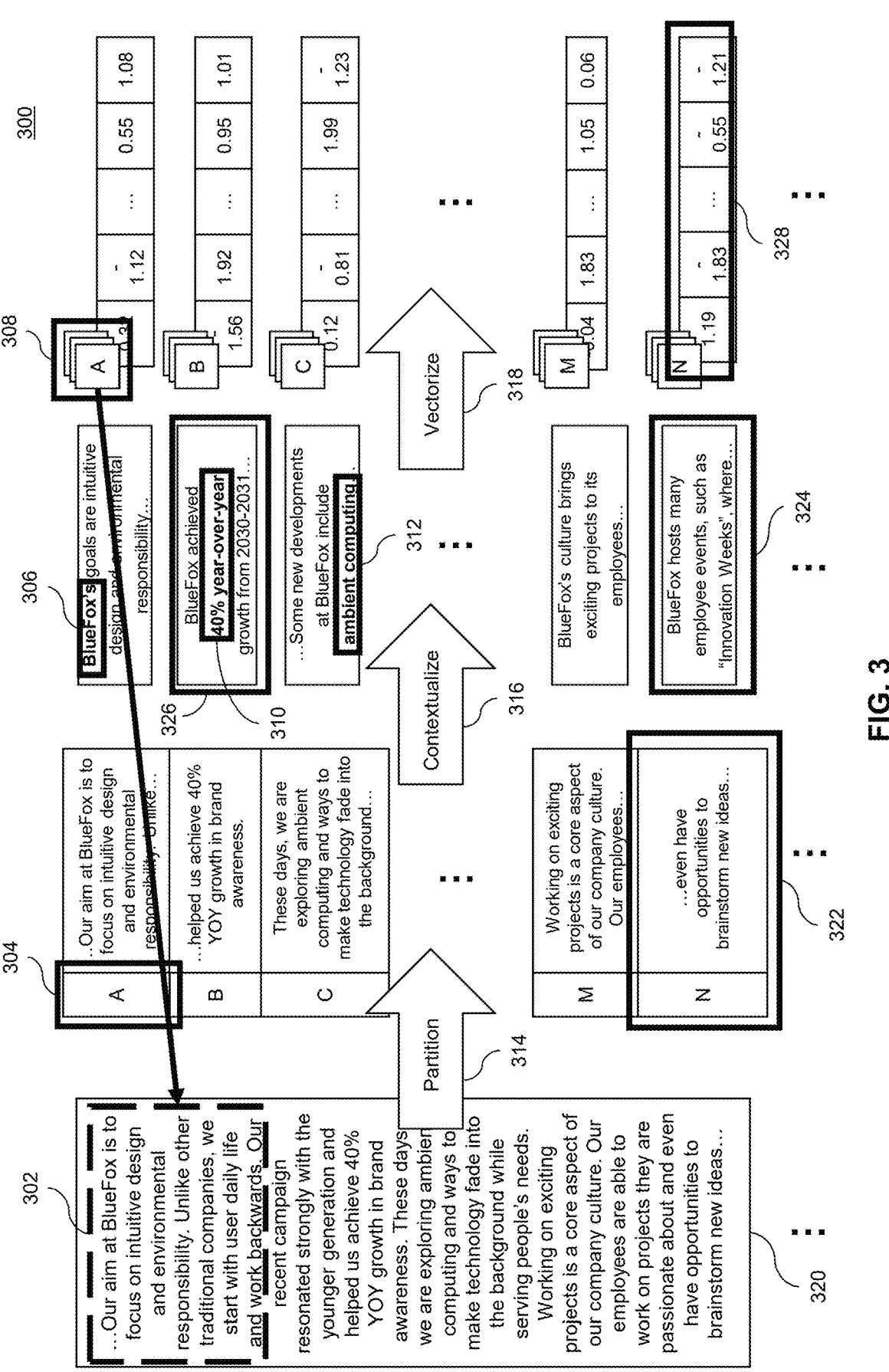
FIG. 3 shows an example environment for generating insights, according to some aspects.

FIG. 3 shows an example block diagram of an environment 300 for extracting insights, according to some aspects. Operations described may be implemented by processing logic that may comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 3, as will be understood by a person of ordinary skill in the art. Environment 300 shall be described with reference to FIGS. 1-2. However, environment 300 is not limited to those example aspects.

In some aspects, environment 300 may receive a piece of content 320 (or content section) from which to extract insights. Content 320 may discuss various topics or ideas within a company. For example, as shown in FIG. 3, content 320 may be a text document that reads: " . . . Our aim at BlueFox is to focus on intuitive design and environmental responsibility. Unlike other traditional companies, we start with user daily life and work backwards. Our recent campaign resonated strongly with the younger generation and helped us achieve 40% year-over-year growth in brand awareness. These days, we are exploring ambient computing and ways to make technology fade into the background while serving people's needs. Working on exciting projects is a core aspect of our company culture. Our employees are able to work on projects they are passionate about and even have opportunities to brainstorm new ideas . . . ."

In 314, environment 300 may partition content 320 into one or more content segments 322. For example, insight-based research synthesis platform 102 may leverage insight generation engine 120 to partition content 320 to obtain a corresponding set of content segments. Insight generation engine 120 may first construct a prompt for LPS 106 to identify content segments that capture a single idea or concept. Insight generation engine 120 may then employ LPS interface 124 with the constructed prompt to obtain the content segments. For example, insight generation engine 120 may obtain content segments that read: " . . . Our aim at BlueFox is to focus on intuitive design and environmental responsibility. Unlike . . . ," " . . . helped us achieve 40% year-over-year growth in brand awareness," "These days, we are exploring ambient computing and ways to make technology fade into the background . . . ," "Working on exciting projects is a core aspect of our company culture. Our employees . . . ," and " . . . even have opportunities to brainstorm new ideas . . . ."

In 314, environment 300 may also extract structured data (e.g., as part of metadata 218). Research synthesis platform 102 may leverage synthesis engine 122 to extract structured data from content 320. Synthesis engine 122 may first construct a prompt for LPS 106 to extract structured data. The prompt may contain a list of possible data points of interest including, but not limited to, numbers, product segments, customer segments, regions, company entities, key purchasing criteria, performance metrics, and the like. Synthesis engine may then employ LPS interface 124 with the constructed prompt to obtain the structured data. The structured data may allow for faster analysis and display of data, as described below in reference to FIGS. 7-9.

In 314, environment 300 may also assign a segment identifier to each content segment (e.g., content segment ID 304). For example, insight-based research synthesis platform 102 may leverage insight generation engine 120 to generate and assign a unique content segment identifier for each content segment obtained. As depicted in FIG. 3, insight generation engine 120 may assign a content segment ID 304 of "A" to a content segment that reads: " . . . Our aim at BlueFox is to focus on intuitive design and environmental responsibility. Unlike . . . " Insight generation engine 120 may then assign a content segment ID of "B" to a content segment that reads: " . . . helped us achieve 40% year-over-year growth in brand awareness." Insight generation engine 120 may then assign a content segment ID of "C" to a content segment that reads: "These days, we are exploring ambient computing and ways to make technology fade into the background . . . ." Insight generation engine 120 may then assign a content segment ID of "M" to a content segment that reads: "Working on exciting projects is a core aspect of our company culture. Our employees . . . " Insight generation engine 120 may then assign a content segment ID of "N" to a content segment that reads: " . . . even have opportunities to brainstorm new ideas . . . ." Environment 300 may also generate one or more hyperlinks for each identifier, which may be used to direct a client interface to a corresponding content segment within content 320 or specific excerpts within the corresponding content segment.

In 316, environment 300 may contextualize each content segment into a corresponding insight. For example, insight-based research synthesis platform 102 may leverage synthesis engine 122 to contextualize the content segments obtained from content 320 to obtain a corresponding set of insights. Synthesis engine 122 may construct a prompt for LPS 106 to obtain an insight text from a content segment. In some aspects, synthesis engine 122 may wrap the content segment with additional context (e.g., other content segments from content 320, content 320 itself, other pieces of content related to content 320, etc.) inside a prompt template. Synthesis engine 122 may then employ LPS interface 124 to query LPS 106 and obtain a corresponding insight text (e.g., insight texts 324 and 326).

In some aspects (e.g., as in FIG. 3), each insight text may be one or more sentences in narrative form. As a few examples, insight generation engine 120 may obtain an insight text for content segment ID "A" that reads: "Blue-Fox's goals are intuitive design and environmental responsibility . . . ." Insight generation engine 120 may also obtain an insight text for content segment ID "B" that reads: "BlueFox achieved 40% year-over-year growth from 2030-2031 . . . ." Insight generation engine 120 may also obtain an insight text for content segment ID "C" that reads: " . . . Some new developments at BlueFox include ambient computing . . . ." Insight generation engine 120 may also obtain an insight text for content segment ID "M" that reads: "BlueFox's culture brings exciting projects to its employees . . . ." Insight generation engine 120 may also obtain an insight text for content segment ID "N" that reads: "BlueFox hosts many employee events, such as 'Innovation Weeks', where . . . ." However, the format of the insight text is not limited to just sentences. Alternatively or additionally, each insight text may take on any other forms, such as a question and answer pairing, a bullet point list, XML formatted text, etc., as would be appreciated by one of ordinary skill in the art. An example question and answer pairing may read: "What are BlueFox's goals? . . . . BlueFox is focused on . . . ."

As a first example, insight generation engine 120 may obtain an insight text 324 that contains a higher density of information than its corresponding content segment, e.g., content segment 322. In this example, content segment 322 may discuss an idea from content 320 concerning employee "opportunities to brainstorm new ideas." However, it may be the case that the name for such opportunities, "Innovation Weeks," is not revealed until much later in content 320. It may also be the case that the content segment containing this extra context mostly discusses a separate idea (e.g., marketing efforts and results), and thus a semantic search for "employee events" would not successfully return that content segment. By contextualizing each content segment (e.g., by sending content 320 or a batch of additional content segments to LPS 106), the resultant insight text (e.g., insight text 324) may contain all the salient data points from content segment 322 along with additional context it previously did not contain (e.g., "Innovation Weeks"). Alternatively or additionally, converting to insight text 324 may remove any unnecessary text from content segment 322 and effectively represent the same (or additional) information more efficiently.

As another example, insight generation engine 120 may obtain an insight text 326 that also contains a higher density of information than its corresponding content segment (e.g., segment "B"). In this example, segment "B" may read: " . . . helped us achieve 50% YOY growth in brand awareness." Here, segment "B" may be discussing a business or financial performance metric of a company (e.g., year-over-year growth). To a computing system however, it may not be immediately apparent what metric the acronym "YOY" stands for, especially depending on how segment "B" was partitioned. Additionally, depending on the embedding model that is chosen, "50% YOY" may not be correctly represented semantically within a vector space. For example, the embedding model may simply embed "YOY" as the acronym itself, without any indication of the business or financial context of segment "B" or content 320. Even more detrimentally, a computing system may interpret or embed "YOY" in erroneous contexts, such as in biological contexts (e.g., "young-of-year") or other specific contexts. As such, insight text 326 may include an expanded version of "YOY" to clarify the term's context, thus contributing to a higher density of information as compared to segment "B."

In some aspects, environment 300 may recognize that simply expanding the "YOY" metric acronym still leaves out additional context that would be helpful for interpreting content segment "B." For example, segment "B" may not include the year to which the YOY growth metric pertains. Similar to the first example, this information may lie within another content segment of content 320. Alternatively or additionally, this information may lie within an entirely separate piece of content (e.g., another piece of content curated by content curation platform 108 alongside content 320, another piece of content from the same or related information source, a piece of content uploaded by a client device (e.g., client device 104), a piece of content scraped from the internet, etc.). Then, LPS 106 may leverage any additional context provided by insight generation engine 120 to include the year(s) (e.g., "2031-2032") within insight text 326, which also contributes to a higher density of information as compared to the original segment "B."

In 316, environment 300 may also extract structured data from the insight texts for piece of content 320. For example, insight-based research synthesis platform 102 may leverage insight generation engine 120 to extract metrics and named entities from the obtained insight texts (e.g., insight texts

324 and 326). In such an example, insight generation engine 120 may first construct a prompt for LPS 106 to extract metrics and entities from insight text 324 and insight text 326. Insight generation engine 120 may then employ LPS interface 124 to query LPS 106 and obtain the metrics and entities. Alternatively or additionally, insight generation engine 120 may also consult an entity data model to determine whether an extracted entity obtained from LPS 106 is a taggable entity within insight-based research synthesis platform 102. The data model may define all taggable entities within insight-based research synthesis platform 102 and the relationships among and between them. Looking to FIG. 3, in 306, insight generation engine 120 may obtain the "BlueFox" named company entity from the insight text corresponding to content segment "A" (insight text "A"). In 310, insight generation engine 120 may obtain the "40% YOY 2030" metric from insight text "B" (e.g., insight text 326). In 312, insight generation engine 120 may obtain the "ambient computing" named market entity from insight text "C." Upon extracting metric and entity data, environment 300 may assign the extracted data as metadata to the corresponding insights (e.g., metadata 308).

In 318, environment 300 may vectorize each insight text into corresponding insight embeddings. For example, insight-based research synthesis platform 102 may leverage vectorization engine 114 to convert the insight texts obtained from content 320 into a corresponding set of insight embeddings (e.g., using any of the techniques disclosed above). For example, vectorization engine 114 may obtain an insight embedding from insight text "A" (embedding "A") with a value of (0.32, −1.12, . . . , 0.55, 1.08). Vectorization engine 114 may also obtain an insight embedding from insight text "B" with a value of (1.56, 1.92, . . . , 0.95, 1.01). Vectorization engine 114 may also obtain an insight embedding from insight text "C" with a value of (0.12, −0.81, . . . , 1.99, −1.23). Vectorization engine 114 may also obtain an insight embedding from insight text "M" with a value of (0.04, 1.83, . . . , 1.05, 0.06). Vectorization engine 114 may also obtain an insight embedding from insight text "N" (e.g., insight embedding 328) with a value of (1.19, −1.83, . . . , −0.55, −1.21).

In some aspects, environment 300 may then obtain insights for content 320. For example, insight-based research synthesis platform 102 may generate each insight by grouping each insight text (e.g., insight text 324) with its corresponding insight embedding (e.g., insight embedding 328), and additional corresponding metadata (e.g., content segment ID "N," metrics, entities, hyperlinks, etc.) to obtain insights "A"-"N." For example, in 308, metadata for the insight with content segment ID "A" (insight "A") may be linked to and/or contain a hyperlink to the location of segment "A" within content 320 (e.g., location 302).

As with the examples described above, examples of specific pieces of content, content segments, content segment IDs, insights, insight texts, structured data, and additional insight metadata have been described herein. However, these examples are not meant to be limiting nor meant to represent an exhaustive list of possible implementations. The scope of the technology disclosed herein is not limited to only these examples, and other implementations are contemplated as appreciated by one skilled in the art.

Figure 4:
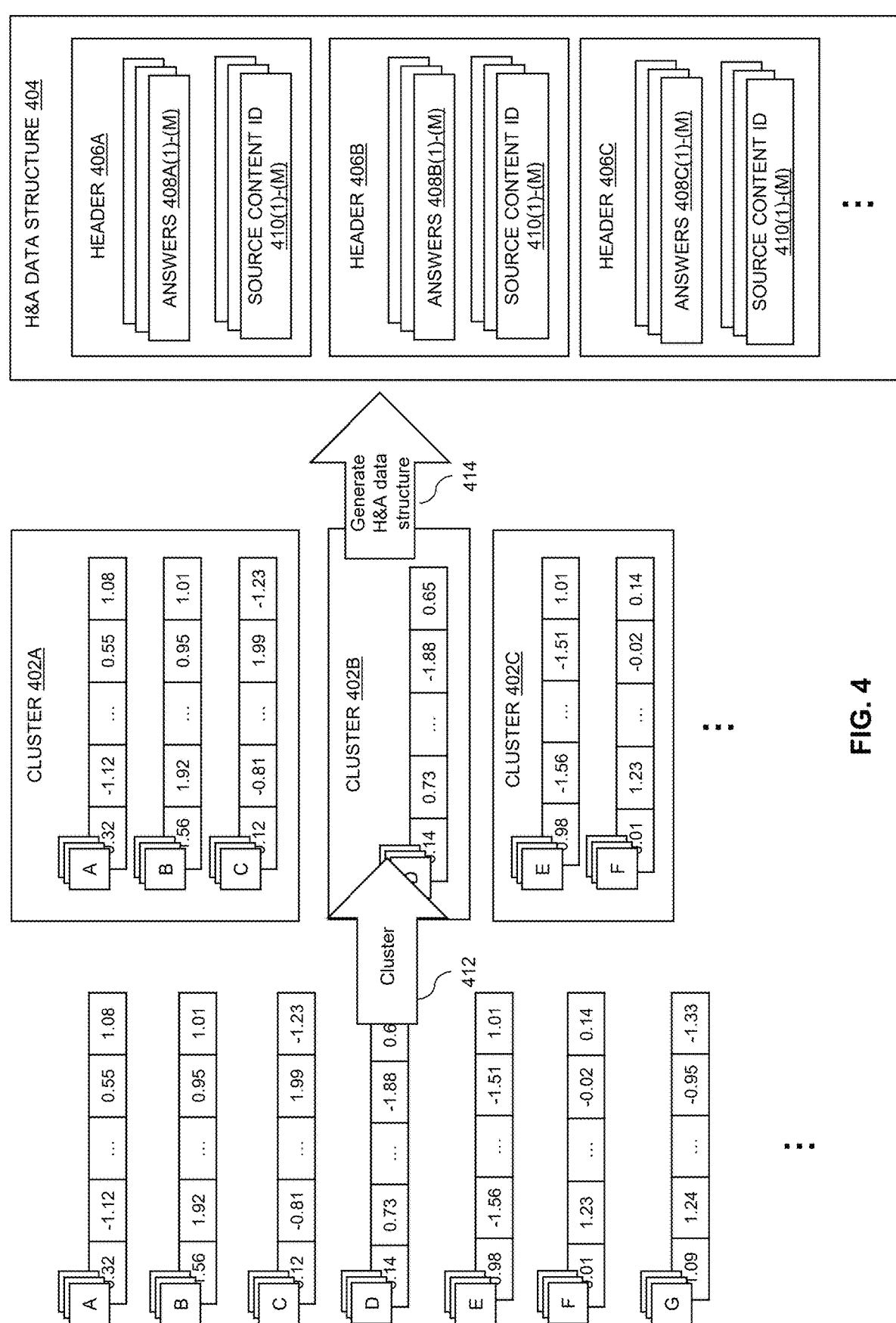
FIG. 4 shows an example environment for automatically generating header and answer pairs, according to some aspects.

FIG. 4 shows an example block diagram of an environment 400 for automatically generating a set of headers and answers, according to some aspects. Operations described may be implemented by processing logic that may comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 4, as will be understood by a person of ordinary skill in the art. Environment 400 shall be described with reference to FIGS. 1-3. However, environment 400 is not limited to those example aspects.

Environment 400 may cluster a set of insights corresponding to a piece of content or group of content (e.g., a piece content from content 112, content 320, or a piece of content received from client device 104). In some aspects, environment 400 may receive a query that causes the platform to cluster a set of insights. For example, insight-based research synthesis platform 102 (of FIG. 1) may receive a client or system query about a project (e.g., project 226) or angle (e.g., angle 228) that causes the platform to cluster a set of insights that correspond to the project or angle, respectively. For example, a user may use client device to generate a query about a competitor of company A, which causes the platform to cluster relevant insights.

In 412, environment 400 may cluster the set of insights. For example, insight-based research synthesis platform 102 may leverage clustering engine 118 to perform clustering on insights "A"-"G" (e.g., using any of the various techniques disclosed above). Insights "A"-"G" may be examples of insights 128 (of FIG. 1) and insights 208A-208X (of FIG. 2). Clustering engine 118 may obtain clusters 402A, 402B, and 402C. Cluster 402A may include insight "A," insight "B," and insight "C." This may be because insights "A," "B," and "C" are the most similar to each other as compared to the other insights and thus form a cluster. For example, this may include performing comparisons between insight embeddings "A," "B," and "C" and the other insight embeddings to obtain the cluster result.

Cluster 402B may include insight "D." Insight "D" may not meet a predetermined similarity threshold to form a cluster with other insights and may be distinct form other clusters. Thus insight "D" may qualify as its own cluster. Cluster 402C may include insight "E" and insight "F." Insights "E" and "F" may be more similar to each other as compared to the other insights and are likewise distinct from other clusters (e.g., clusters 402A and 402B). While not explicitly shown in FIG. 4, the remaining insights (e.g., insights "G", etc.) may form clusters in a similar manner to insights "A"-"F."

In 414, environment 400 may generate a header and answer (H&A) data structure 404. For example, insight-based research synthesis platform 102 may leverage synthesis engine 122 to generate H&A data structure 404. H&A data structure 404 may contain headers 406A-406C (collectively headers 406) corresponding to each cluster 402A-402C. Each header 406 may have one or more corresponding answers and source content IDs, which may correspond to the piece of content from which the answers are obtained or other insights 128 or pieces of content 132. For example, header 406A may have corresponding answers 408A(1)-408A(M) (collectively answers 408A) and source content IDs 410(1)-410(M) (collectively source content IDs 410); header 406B may have corresponding answers 408B(1)-408B(M) (collectively answers 408B) and source content IDs 410(1)-410(M) (collectively source content IDs 410, given the source content is common across all headers 406); header 406C may have corresponding answers 408C(1)-408C(M) (collectively answers 408C) and source content IDs 410(1)-410(M) (collectively source content IDs 410, again given the source content is common across all headers 406).

To obtain headers 406, synthesis engine 122 may formulate prompts (e.g., prompts 130) to query LPS 106. For example, to generate header 406A, synthesis engine 122 may wrap insight text "A," insight text "B," and insight text "C" into a first prompt. Synthesis engine 122 may then employ LPS interface 124 to query LPS 106 for header 406A and/or answers 408A. Querying LPS for headers and answers may be performed using the same or separate queries to LPS 106. Additionally or alternatively, insight-based research synthesis platform 102 may leverage semantic search engine 116 to generate answers 408A. For example, semantic search engine 116 may perform one or more search and retrieval methods on the insights contained within cluster 402A or other content 132 or insights 128, based on header 406A (e.g., using any of the various techniques disclosed above). Synthesis engine 122 may then wrap relevant information identified into another prompt, then employ LPS interface 124 to query LPS 106 for answers extracted from this relevant information, based on header 406A. Synthesis engine 122 may populate H&A data structure 404 with the resulting header 406A, answers 408A and source content IDs 410.

Similarly, to generate header 406B, synthesis engine 122 may wrap insight text "D" into another prompt. Synthesis engine 122 may then employ LPS interface 124 to query LPS 106 for header 406B and answers 408B. Additionally or alternatively, insight-based research synthesis platform 102 may leverage semantic search engine 116 to generate answers 408B. For example, semantic search engine 116 may perform one or more search and retrieval methods on the insights contained within cluster 402B or other content 132 or insights 128, based on header 406B (e.g., using any of the various techniques disclosed above). Synthesis engine 122 may then wrap relevant information identified into another prompt, then employ LPS interface 124 to query LPS 106 for answers extracted from this relevant information, based on header 406B. Synthesis engine 122 may then populate H&A data structure 404 with the resulting header 406B, answers 408B, and source content IDs 410. Synthesis engine 122 may also wrap insight text "E" and insight text "F," into another prompt. Synthesis engine 122 may then employ LPS interface 124 to query LPS 106 for header 406C and answers 408C. Additionally or alternatively, insight-based research synthesis platform 102 may leverage semantic search engine 116 to generate answers 408C. For example, semantic search engine 116 may perform one or more search and retrieval methods on the insights contained within cluster 402C or other content 132 or insights 128, based on header 406C (e.g., using any of the various techniques disclosed above). Synthesis engine 122 may then wrap relevant information identified into another prompt, then employ LPS interface 124 to query LPS 106 for answers extracted from this relevant information, based on header 406C. Synthesis engine 122 may then populate H&A data structure 404 with the resulting header 406C, answers 408C, and source content IDs 410. In some aspects, environment 400 may continue generating H&A pairs for any remaining identified clusters following a similar process (e.g., clusters formed from insights "G", etc.).

As with the examples described above, specific data structure generation examples have been described herein. However, these examples are not meant to be limiting nor meant to represent an exhaustive list of possible implementations. The scope of the technology disclosed herein is not limited to only these examples, and other implementations are contemplated as appreciated by one skilled in the art.

Figure 5:
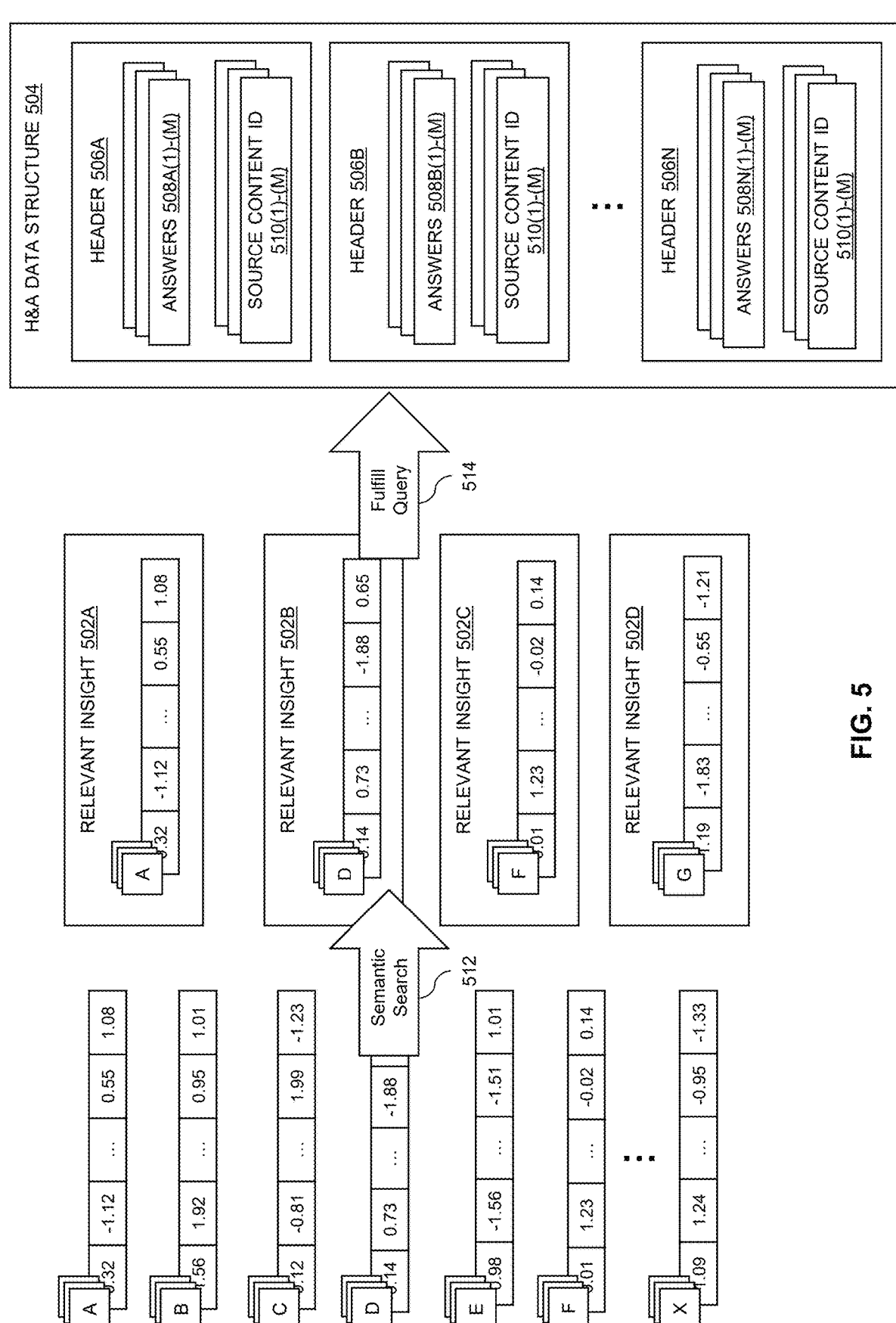
FIG. 5 shows an example environment for fulfilling a user query, according to some aspects.

FIG. 5 shows an example block diagram of an environment 500 for fulfilling a query, according to some aspects. Operations described may be implemented by processing logic that may comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 5, as will be understood by a person of ordinary skill in the art. Environment 500 shall be described with reference to FIGS. 1-4. However, environment 500 is not limited to those example aspects.

In some aspects, environment 500 may receive a query. For example, insight-based research synthesis platform 102 may receive a client or system query (e.g., user query 142 from client device 104) to display information relating to content 132 stored in data store 126. For example, user query 142 may request that an additional column describing growth metrics for company A be added to an existing table.

In 512, environment 500 may first retrieve a set of relevant insights. For example, insight-based research synthesis platform 102 may leverage semantic search engine 116 to perform one or more search and retrieval methods on insights "A"-"X" (e.g., using any of the various techniques disclosed above). Insights "A"-"X" may be examples of insights 128 and insights 208A-208X. Furthermore, insights "A"-"X" may be associated with a project or angle (e.g., project 226, angle 228). Semantic search engine 116 may obtain relevant insights 502A, 502B, 502C, and 502D (collectively, relevant insights 502) based on a user query (e.g., user query 142). In some aspects, semantic search engine 116 may have determined these insights as relevant insights 502 based on vector similarity comparisons between insights "A"-"X" and a vector representation of the user query generated by vectorization engine 114. For example, insights "A," "D," "F," and "G" may have the highest similarity values or similarity values above a predetermined similarity threshold compared to the vector representation of the user query.

In 514, environment 500 may fulfill the user query. For example, insight-based research synthesis platform 102 may leverage synthesis engine 122 to generate a query result in the form of H&A data structure 504 based on the user query, relevant insights 502 and/or other information. H&A data structure 504 may include one or more headers 506A-N (collectively headers 506). Each header 506 may have one or more corresponding answer(s) (e.g., in the case of M answers, answers 508A(1)-(M), 508B(1)-(M), . . . , 508N (1)-(M), collectively answers 508) and one or more source content IDs (e.g., source content IDs 510(1)-(M), collectively source content IDs 510), which may correspond to the pieces of content from which answer(s) are retrieved. For example, header 506A may have corresponding answers 508A(1)-508A(M) and source content IDs 510(1)-510(M); header 506N may have corresponding answers 508N(1)-508N(M) and source content IDs 510(1)-510(M), etc.

To generate H&A data structure 504, synthesis engine 122 may first formulate a prompt to generate one or more headers 506 from the user input. Synthesis engine may then employ LPS interface 124 to query LPS 106 to using the constructed prompt to obtain one or more headers 506. In one non-limiting example, if the user input contains a question such as "What were the quarterly earnings for company X between 2020-2022," headers 506 may include "Quarterly earnings for company X in Q1 2020," "Quarterly earnings for company X in Q2 2020," etc. In some aspects, the constructed prompt may specify the final format of headers 506. For example, the constructed prompt may specify that headers 506 contain less than three words, such as "Q2 2020 earnings." This may allow for easier population into a visual display, as described below.

Synthesis engine 122 may then formulate a prompt to obtain one or more answers 508 using one or more headers 506, relevant insights 502. Synthesis engine may employ LPS interface 124 to query LPS 106 using the constructed prompt to obtain answers 508 and source content IDs 510. In some aspects, the constructed prompt may specify the final format of answers 508. For example, the constructed prompt may specify that answers 508 include numerical values.

Additionally or alternatively, insight-based research synthesis platform 102 may leverage semantic search engine 116 to determine answers 508 and source content IDs 510 using structured data (e.g., from metadata 218) associated with relevant insights 502, data from additional information sources 113, and/or data from content 132. For example, semantic search engine 116 may extract answers 508 and source content IDs 510 based on vector similarity comparisons between the structured data and a vector representation of the user query generated by vectorization engine 114. For example, answers 508 may have the highest similarity values or similarity values above a predetermined similarity threshold compared to the vector representation of the user query.

As with the examples described above, specific query fulfillment examples have been described herein. However, these examples are not meant to be limiting nor meant to represent an exhaustive list of possible implementations. The scope of the technology disclosed herein is not limited to only these examples, and other implementations are contemplated as appreciated by one skilled in the art.

Figure 6:
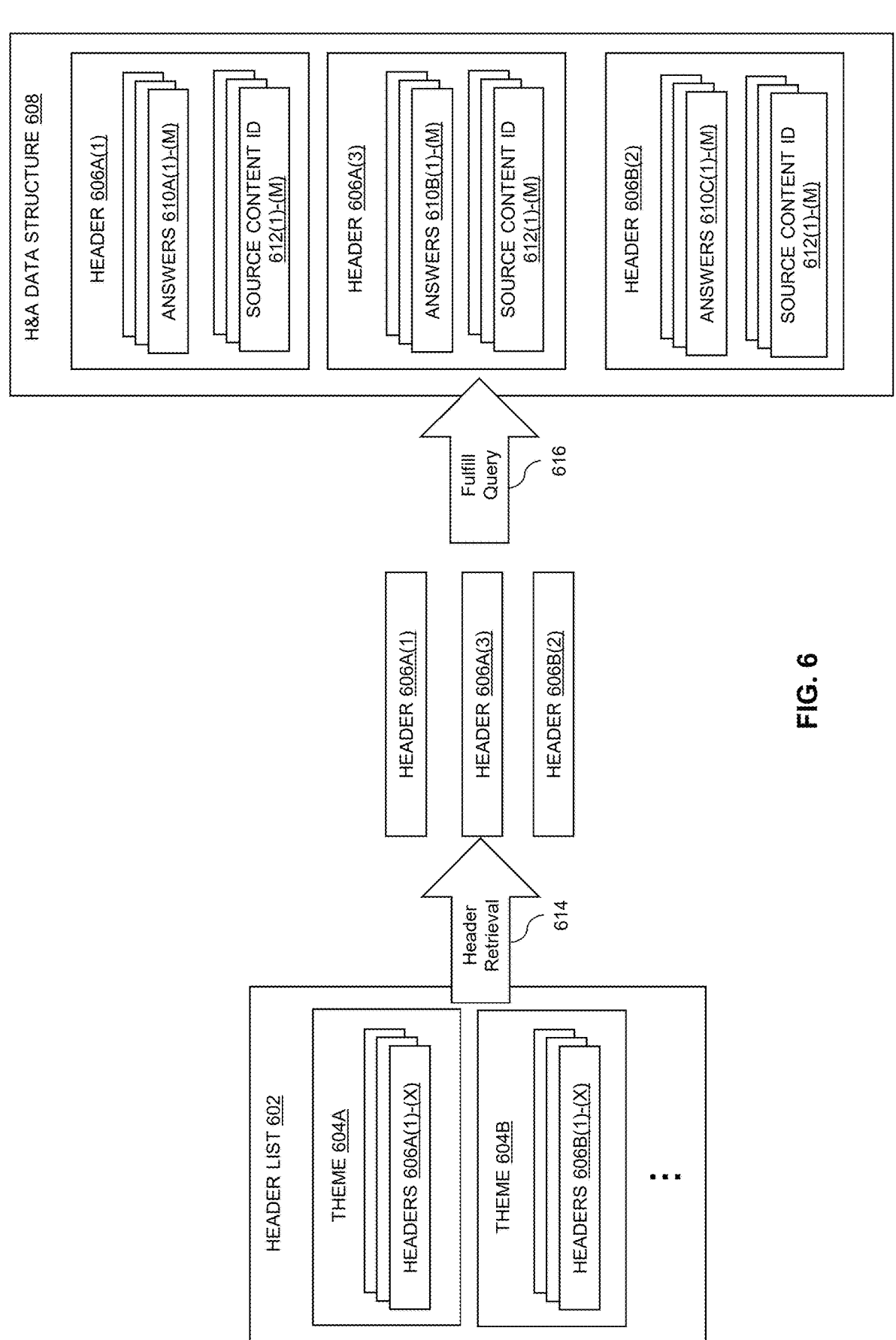
FIG. 6 shows an alternative example environment for fulfilling a user query, according to some aspects.

FIG. 6 shows an example block diagram of an environment 600 for generating header and answer data structure, according to some aspects. Operations described may be implemented by processing logic that may comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 6, as will be understood by a person of ordinary skill in the art. Environment 600 shall be described with reference to FIGS. 1-4. However, environment 600 is not limited to those example aspects.

In some aspects, environment 600 may receive a query. For example, insight-based research synthesis platform 102 may receive a client or system query (e.g., user query 142 from client device 104) to display information relating to content 132 stored in data store 126. For example, a user query may ask for a ten year projection for company A.

In 614, environment 600 may retrieve one or more relevant headers. For example, insight-based research platform 102 may leverage semantic search engine 116 or other algorithms (e.g. retrieving structured groups of headers deterministically given user inputs) to perform one or more search retrieval methods on a predefined header list 602. Header list 602 may be stored in a data store, for example data store 126 or data store 202. Header list 602 may contain a series of themes 604A, 604B, . . . (collectively themes 604)

that relate to general analysis categories, such as markets, products, revenues, costs, competitors, and the like. Each theme 604 may contain a set of headers (e.g., 606A(1)-(X), 606B(1)-(X), . . . , collectively headers 606) for conducting granular analysis related to an analysis category. For example, theme 604A may contain headers 606A(1)-606A (X), theme 604B may contain headers 606B(1)-606B(X), and so on.

Semantic search engine 116 may obtain relevant headers based on a user query (e.g., user query 142). In some aspects, semantic search engine 116 may have determined headers 606 as relevant based on vector similarity comparisons between headers 606 and a vector representation of the user query generated by vectorization engine 114. For example, headers 606A(1), 606A(3), and 606B(2) may have the highest similarity values or similarity values above a pre-determined similarity threshold compared to the vector representation of the user query. Alternatively, semantic search engine 116 may determine relevant headers based on vector similarity between themes 604 and a vector representation of a user query generated by vectorization engine 114. For example, theme 604A may have the highest similarity value or a similarity value above a predetermined similarity threshold compared to the vector representation of the user query. In this scenario, the relevant headers may be the headers 606A(1)-606A(X) included in theme 604A. In some aspects, matching user queries to themes 604 then retrieving headers 606 according to those themes may allow for generation of a more granular H&A data structure 608.

In 616, environment 600 may generate an H&A (header and answer) data structure 608. H&A data structure 608 may contain relevant headers (e.g., 606A(1), 606A(3), and 606B (2)) and answers (i.e., 610A(1)-(M), 610B(1)-(M), 610C(1)-(M), collectively answers 610) corresponding to the relevant headers, and source content IDs (e.g., 612(1)-(M), collectively source content IDs 612), which identify the pieces of content from which the answers are retrieved. For example, header 606A(1) may correspond to answers 610A(1)-610A(M) and relevant source content IDs 612(1)-(M), header 606A(3) may correspond to answers 610B(1)-610B(M) and source content IDs 612(1)-(M), and header 606B-(2) may correspond to answers 610C(1)-610C(M) and source content IDs 612(1)-(M).

In some aspects, insight-based research synthesis platform 102 may leverage semantic search engine 116 to extract answers 610 from structured data (e.g., within metadata 218 or additional information sources 113). For example, semantic search engine 116 may perform vector similarity comparisons between retrieved headers 606 and data categories (or labels) within the structured data to determine relevant data categories. The relevant data categories may have the highest similarity value or a similarity value above a predetermined similarity threshold compared to the vector representation of relevant headers. Semantic search engine 116 may then populate answers 610 (and source content IDs 612) with data contained within the relevant categories. Additionally or alternatively, semantic search engine 116 may use vector similarity comparisons to retrieved headers 606 to extract answers 610 and source content IDs 612 from insights directly (e.g., insights 208A-208X).

Alternatively, insight-based research synthesis platform 102 may leverage synthesis engine 122 to generate H&A data structure 608. Synthesis engine 122 may formulate a prompt based on the retrieved headers 606 (e.g., 606A(1), 606A(3), and 606B(2)) structured data (e.g., within metadata 218 or additional information sources 113) and/or insights.

The prompt may specify the final format of headers and answers. For example, the prompt may specify that these values take a numerical format, or three words or less. Synthesis engine 122 may then employ LPS interface 124 to query LPS 106 to using the constructed prompt to obtain H&A data structure 608.

As with the examples described above, specific query fulfillment examples have been described herein. However, these examples are not meant to be limiting nor meant to represent an exhaustive list of possible implementations. The scope of the technology disclosed herein is not limited to only these examples, and other implementations are contemplated as appreciated by one skilled in the art.

Figure 7:
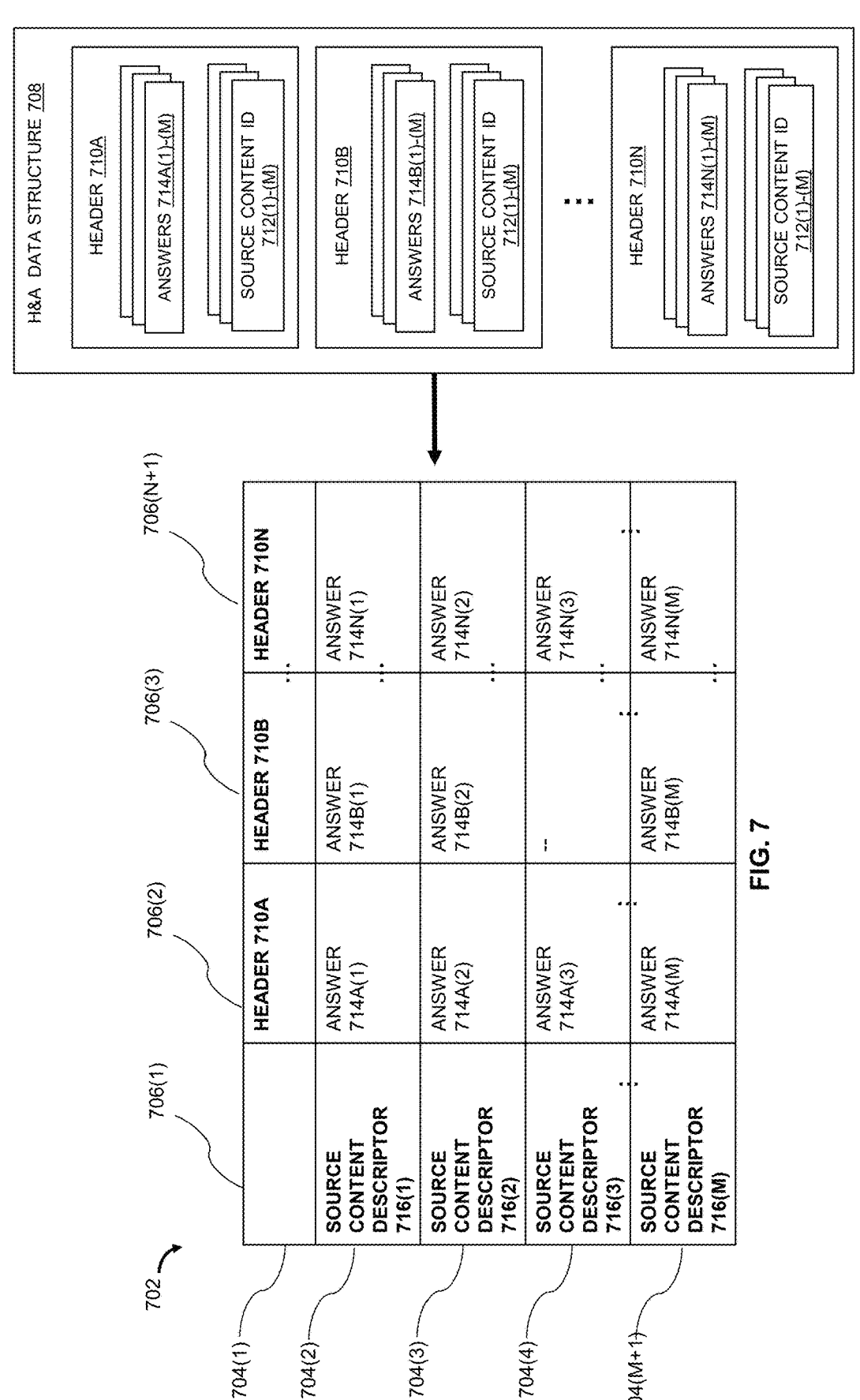
FIG. 7 shows and example process for generating a table, according to some aspects.

FIG. 7 shows an example process 700 for displaying a table, according to some aspects. Operations described may be implemented by processing logic that may comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 7, as will be understood by a person of ordinary skill in the art. Process 700 shall be described with reference to FIGS. 1-6. However, process 700 is not limited to those example aspects.

In process 700, a table 702 may be populated. Table 702 may provide a visual display for data contained within insights (e.g., insights 208A-208X). Table 702 may contain rows 704(1)-704(M+1) (collectively rows 704) (e.g., one more row than the number of source content IDs 712) and columns 706(A)-706(N+1) (collectively columns 706) (e.g., one more column than the number of headers 710).

In some aspects, cells of table 702 are populated with data contained within H&A data structure 708. H&A structure 708 may be an example of H&A data structure 504 of FIG. 5 or H&A structure 606 of FIG. 6. Insight-based research synthesis platform 102 may leverage display engine 135 to generate table 702 using H&A data structure 708. For example, display engine 135 may populate cells in columns 706(B)-706(N+1) of first row 704(1) of table 702 with headers 710A-710N, and cells of rows 704(2)-704(M+1) of column 706(A) with source content descriptors 716(1)-(M). Source content descriptors 716(1)-(M) may describe the pieces of source content corresponding to source content IDs 712(1)-(M). Display engine 135 may then populate the cells of rows 704(2)-704(M+1) and columns 706(B)-706(N+1) with answers 714A(1)-(M), 714B(1)-(M), . . . , 714N(1)-(M) (collectively answers 714). Each answer in answers 714 may be placed in a cell that corresponds to the header it answers and the source content ID to which it relates. For example, answer 714A(1) answers header 710A using source content ID 712(1) and answer 714A(2) answers header 710A using source content ID 712(2), etc.

If a piece of source content does not include an answer to a header 710, the corresponding cell in the table may be left blank or indicate a null value, in some embodiments. For example, the cell in table 702 corresponding to source content ID 712(3) and header 710B contains two dashed lines.

In some aspects, more than one H&A data structure 708 may be leveraged by display engine 135 to populate table 702. For example, table 702 may be populated by both automatically generated header and answer pairs, as described in reference to FIG. 4 or header and answer pairs generated in response to a user query, as described in reference to FIGS. 5 and 6.

In some aspects, table 702 is displayed on client device 104 via user interface 136. User interface 136 may include on or more functionalities (e.g., buttons, text boxes, drop-down menus, etc.) that allow a user to edit table 702. For example, a user may edit text within the cell or delete or rearrange rows/columns. A user may add a header to table 702 by submitting a query via user interface 136. In response to the user query, insight-based research synthesis platform 102 may determine answers to the user query as described in reference to FIGS. 5 and 6.

As with the examples described above, specific tabular display examples have been described herein. However, these examples are not meant to be limiting nor meant to represent an exhaustive list of possible implementations. The scope of the technology disclosed herein is not limited to only these examples, and other implementations are contemplated as appreciated by one skilled in the art.

Figure 8:
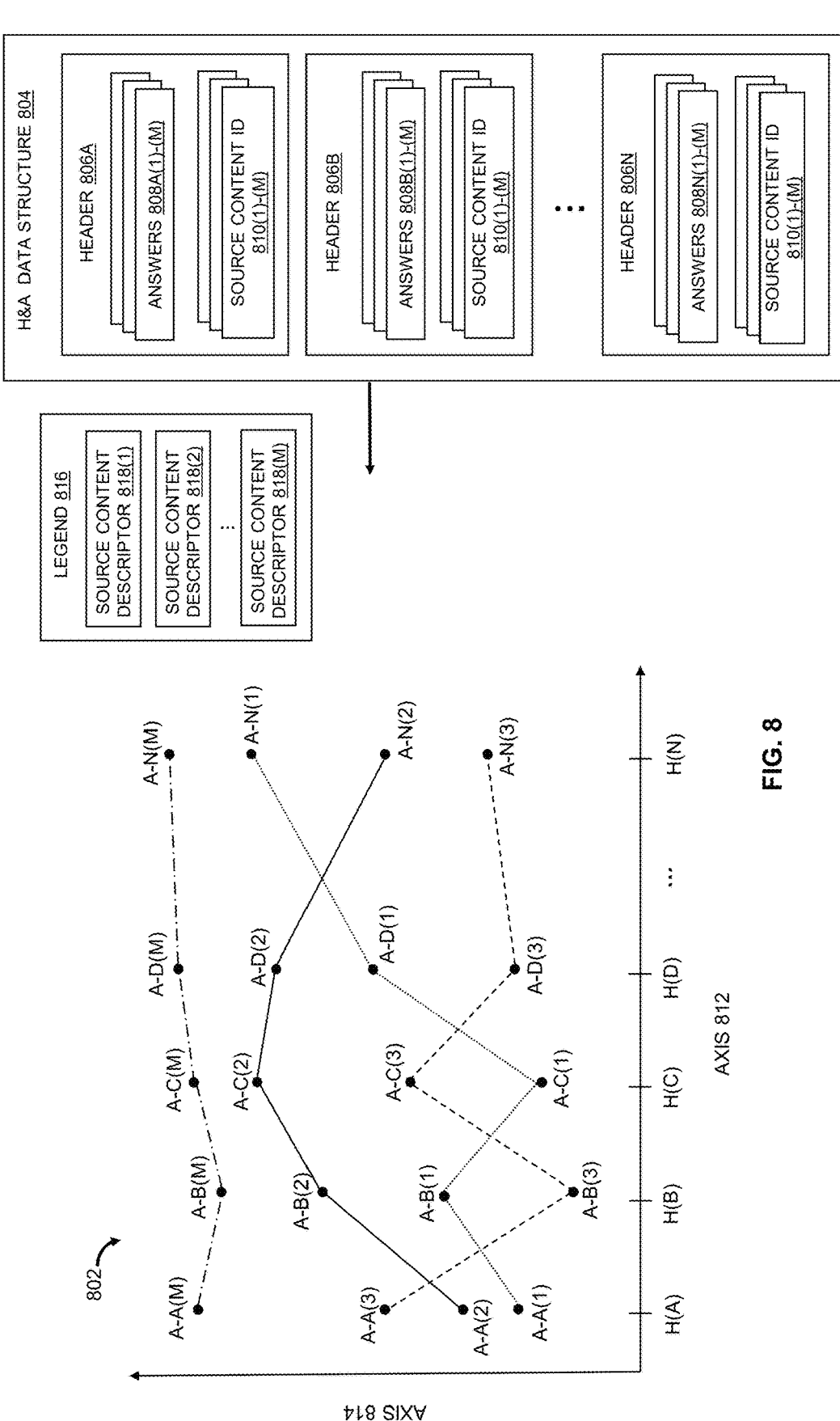
FIG. 8 shows an example process for generating a graph, according to some aspects

FIG. 8 shows an example process 800 for generating a graphical display based on a header and answer (H&A) data structure, according to some aspects. Operations described may be implemented by processing logic that may comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 8, as will be understood by a person of ordinary skill in the art. Process 800 shall be described with reference to FIGS. 1-6. However, process 800 is not limited to those example aspects.

In process 800, a graphical display 802 may be generated. Graphical display 802 may plot data contained within an H&A data structure 804. In some aspects, H&A structure 804 includes headers 806A-806N (collectively 806, abbreviated as H-(A), . . . H-(N)) on axis 812 of graph 802 of FIG. 8), source content IDs 810(1)-(M), and corresponding sourced answers 808A(1)-(M), 808B(1)-(M), . . . 808N(1)-(M) (collectively 808, abbreviated as A-A(1), . . . , A-N(M) in graph 802 of FIG. 8, where A-N(M) denotes the answer to header N generated from information sourced from content piece M).

In some aspects, insight-based research synthesis platform 102 may leverage display engine 135 to extract and plot answers 808 as a function of headers 806. For example, display engine 135 may generate a table of answers to various headers, sourced from source content, as described in FIG. 7. As one example, when answers are numerical, display engine 135 may use the same header and answer structure, but plot the numerical answers on a graph, according to the header they answer and denoting the source piece of content for each answer. Display engine 135 may determine a minimum value, a maximum value, and a step size for values displayed on axis 814 based on the range of numerical values contained within answers 808. Display engine 135 may then populate axis 814 with numerical values and plot answers 808 in the positions of graphical display 802 that correspond to their corresponding header 806 and numerical value. As another example, when answers are non-numerical and ordinal, display engine 135 may use the same header and answer structure, but plot non-numerical answers on a graph, according to the header they answer and denoting the source piece of content for each answer. Display engine 135 may determine the natural order inherent in the answers, then determine appropriate values to display on axis 814 based on the range of ordinal values contained within answers 808. As a non-limiting illustration of this, answers 808 to headers 806 may take the form of the words "high", "neutral", and "low" in context of customer satisfaction with various product features, each a header 806. Display engine 135 may determine that the natural order inherent in the answers is "low", then "neutral", then "high", populate these categories on axis 814, then plot answers 808 in the positions of graphical display 802 that correspond to their corresponding header 806 and ordinal value. Display engine 135 may then plot the headers on axis 812. Additionally, display engine 135 may truncate or reformat headers 806 or answers 808 into a form that is easily displayed on a graph, before plotting either headers 806 or answers 808.

In some aspects, data from more than one H&A data structure may be plotted on graphical display 802. For example, graphical display 802 may plot quarterly earnings for company A, company B, and company C.

In some aspects, graphical display 802 may include a legend 816. Legend 816 may include source content descriptors 818(1)-(M), which correspond to source content IDs 810(1)-(M).

In some aspects, graphical display 802 is displayed on client device 104 via user interface 136. User interface 136 may include on or more functionalities (e.g., buttons, text boxes, drop-down menus, etc.) that allow a user to edit graphical display 802. For example, a user may scale axes 812 and 814, add a title, or add axes labels to graphical display 802. A user may add a data set to graphical display 802 by submitting a query via user interface 136. In response the user query, insight-based research synthesis platform 102 may generate an additional data set as described in reference to FIGS. 5 and 6.

As with the examples described above, specific graphical examples have been described herein. However, these examples are not meant to be limiting nor meant to represent an exhaustive list of possible implementations. The scope of the technology disclosed herein is not limited to only these examples, and other implementations are contemplated as appreciated by one skilled in the art.

Figure 9:
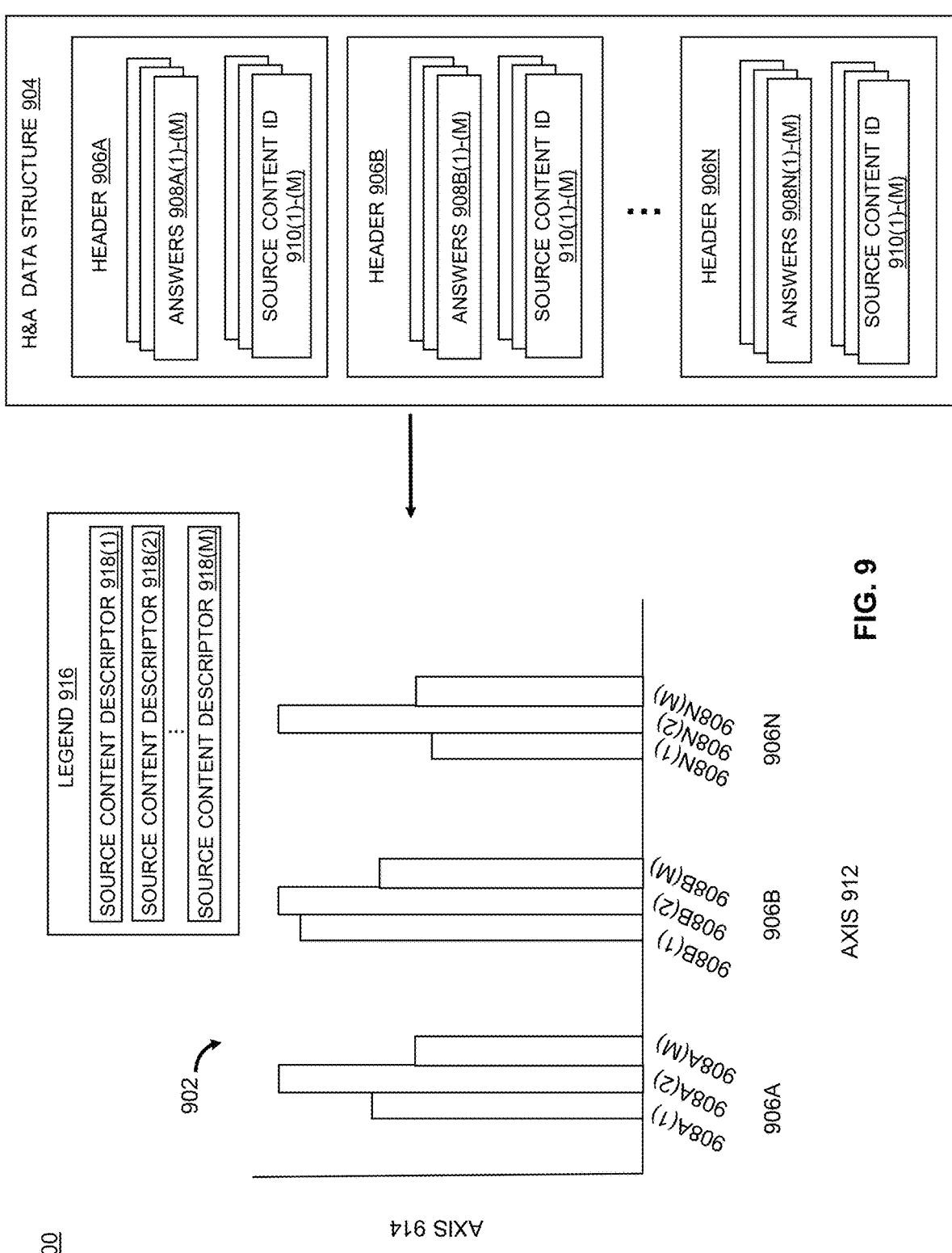
FIG. 9 shows an example process for generating a chart, according to some aspects.

FIG. 9 shows an example process 900 for generating a graphical display based on a data structure, according to some aspects. Operations described may be implemented by processing logic that may comprise hardware (e.g., circuitry, dedicated logic, programmable logic, microcode, etc.), software (e.g., executing on a processing device), or a combination thereof. It is to be appreciated that not all operations may be needed to perform the disclosure provided herein. Further, some of the operations may be performed simultaneously, or in a different order than described for FIG. 9, as will be understood by a person of ordinary skill in the art. Process 900 shall be described with reference to FIGS. 1-6. However, process 900 is not limited to those example aspects.

In process 900, a bar chart 902 may be generated. Bar chart 902 may display data contained within an H&A data structure 904. H&A data structure 904 may include a plurality of headers 906(A)-(N) (collectively headers 906). Headers 906(A)-(N) may include corresponding answers 908 (e.g., answers 908A(1)-(M), 908B(1)-(M), . . . , 908N (1)-(M)) sourced from source documents 910(1)-(M). For example, header 906A may include answers 908A(1)-(M), header 906B may include answers 908B(1)-(M) and header 906N may contain answers 908N(1)-(M). In one non-limiting example, headers 906 may be annual revenues of companies A-N for a given year, and answers 908 may be sourced revenue figures for those companies from relevant pieces of content 1-M.

In some aspects, insight-based research synthesis platform 102 may leverage display engine 135 to generate bar chart 902 from H&A structure 904. As one non-limiting example, in the case answers are numerical, display engine 135 may use the same header and answer structure, but plot the numerical answers on a graph, according to the header they answer and denoting the source piece of content for each answer. Display engine 135 may determine a minimum value, a maximum value, and a step size for values displayed on axis 914 based on the range of numerical values contained within answers 908. Display engine 135 may then populate axis 914 with numerical values and plot answers 908 in the positions of graphical display 902 that correspond to their corresponding header 906 and numerical value, drawing "bars" down to axis 912. Additionally, display engine 135 may truncate or reformat headers 906 (e.g. company names) or answers 908 (e.g. annual revenue figures) into a form that is easily displayed on a graph, before plotting either headers 906 or answers 908.

In some aspects, bar chart 902 may include a legend 916. Legend 916 may include source content descriptors 918(1)-(M), which correspond to source content IDs 910(1)-(M).

In some aspects, bar chart 902 is displayed on client device 104 via user interface 136. User interface 136 may include on or more functionalities (e.g., buttons, text boxes, drop-down menus, etc.) that allow a user to edit bar chart 902. For example, a user may scale axis 914, add a title, delete a data set, or edit axes labels of bar chart 902. A user may add a data set to graphical display 902 by submitting a query via user interface 136. In response the user query, insight-based research synthesis platform 102 may generate an additional data set as described in reference to FIGS. 5 and 6.

As with the examples described above, specific visual display examples have been described herein. However, these examples are not meant to be limiting nor meant to represent an exhaustive list of possible implementations. The scope of the technology disclosed herein is not limited to only these examples, and other implementations are contemplated as appreciated by one skilled in the art.

FIG. 10 shows a block diagram of a method 1000, according to some aspects. Method 1000 may describe a process for extracting and displaying data contained within source content. The steps of method 1000 described below may be implemented by processing logic that may comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than described for FIG. 10, as will be understood by a person of ordinary skill in the art. Method 1000 shall be described with reference to FIGS. 1-9. However, method 1000 is not limited to those example aspects.

At step 1002, an insight-based research synthesis platform may extract insights and structured data from one or more pieces of content. The insight-based research synthesis platform may also tag the one or more pieces of source content to insights extracted. As described above, the insights may be self-contained and semantically coherent representations of content segments. The structured data may include numerical values, company competitors, product segments, customer segments, regions, company entities, key purchasing criteria, performance metrics, TRUE/FALSE statements, and the like, to name a few non-limiting examples. In some aspects, the structured data may contain a series of key-value pairs. The structured data may also contain tags (e.g., company, market, region, industry, etc.) that allow the research synthesis platform to quickly identify the categories of data described the insights.

To create the insights, the insight-based research synthesis platform may partition the one or more pieces of content into one or more content segments by leveraging an insight generation engine (e.g., insight generation engine 120 of FIG. 1). The insight generation engine may construct a prompt for a language processing system (e.g., language processing system 106 of FIG. 1) to identify content segments that capture a single idea or concept. The research synthesis platform may then leverage a synthesis engine (e.g., synthesis engine 122 of FIG. 1) to contextualize each content segment into an insight. Like the insight generation engine, the synthesis engine may construct a prompt for the language processing system to obtain an insight text from a content segment.

The insight-based research synthesis platform may further leverage the synthesis engine to extract structured data from the one or more pieces of content. The synthesis engine may construct a prompt for the language processing system. The prompt may contain a list of possible data points of interest including, but not limited to, statistics, financials, product segments, customer segments, regions, company entities, key purchasing criteria, performance metrics, and the like.

At step 1004, the insight-based research synthesis platform may create a plurality of insight vector embeddings from the plurality of insights. The insight vector embeddings may contain numerical representations of the insight text contained within the insights. In some aspects, the insight-based research synthesis platform leverages a vectorization engine (e.g., vectorization engine 114 of FIG. 1) to convert the insight texts obtained from the one or more source content into a corresponding set of insight embedding (e.g., using any of the techniques disclosed above).

At step 1006, the insight-based research synthesis platform may cluster vector embeddings of the insight vector embeddings to create a plurality of clusters. For example, the insight-based research synthesis platform may leverage a clustering engine (e.g., clustering engine 118 of FIG. 1) to cluster the vector embeddings based on similarity.

At step 1008, the insight-based research synthesis platform may generate a series of headers that describe the plurality of clusters. For example, the insight-based research synthesis platform may utilize the synthesis engine to construct a prompt for the language processing system to identify a header/theme that summarizes the insights in each cluster.

At step 1010, the insight-based research synthesis platform may search for a series of answers corresponding to the series of headers. The series of answers may be obtained from the insight vector embedding and/or other information sources. For example, the insight-based research synthesis platform may leverage a synthesis engine (e.g., synthesis engine 122) to construct a prompt for the language processing system to extract answers to the headers from the insights, structured data, or source content. The prompt may specify a final format for the answers, such as "numerical values" or "three words or less," to name a couple of non-limiting examples.

Alternatively, the research synthesis platform may leverage a semantic search engine (e.g., semantic search engine 116 of FIG. 1) to generate the set of answers. For example, the semantic search engine may perform one or more search and retrieval methods on the structured data and/or insights associated with each cluster, and/or other information sources or content.

Each header in the series of headers may have more than one corresponding answer. For example, a given header may have an answer corresponding to each piece of content in the one or more pieces of content (from which the insights were extracted). The synthesis/semantic search engine may create a header and answer (H&A) data structure that connects the series of answers and their corresponding source content to the series of headers.

At step 1012, insight-based research synthesis platform populates tables, graphs, or other applicable visual formats using headers generated, and answers sourced from each piece of source content. The visual displays may include tables, lists, ranked lists, categorized lists, graphs, line charts, pie charts, bar charts, scatter plots, histograms, distributions, key metric overviews, process flow diagrams, word maps, graphical maps, network diagrams, and the like. The insight-based research synthesis engine may leverage a display engine to generate the visual displays, as described in reference to FIGS. 7-9.

FIG. 11 shows a block diagram of a method 1100, according to some aspects. Method 1100 may describe a process for generating a visual display based on a user query. The steps of method 1100 described below may be implemented by processing logic that may comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than described for FIG. 11, as will be understood by a person of ordinary skill in the art. Method 1100 shall be described with reference to FIGS. 1-10. However, method 1100 is not limited to those example aspects.

At step 1102, an insight-based research synthesis platform (e.g., insight-based research synthesis platform 102) may extract insights and structured data from one or more pieces of content. The insight-based research platform may also tag the one or more pieces of source content to insights extracted. As described above, the insights may be self-contained and semantically coherent representations of content segments. The structured data may include numerical values, company competitors, product segments, customer segments, regions, company entities, key purchasing criteria, performance metrics, TRUE/FALSE statements, and the like, to name a few non-limiting examples. In some aspects, the structured data may contain a series of key-value pairs. The structured data may also contain tags (e.g., company, market, region, industry, etc.) that allow the research synthesis platform to quickly identify the categories of data described in the insights.

To create the insights, the insight-based research synthesis platform may partition the one or more pieces of content into one or more content segments by leveraging an insight generation engine (e.g., insight generation engine 120 of FIG. 1). The insight generation engine may construct a prompt for a language processing system (e.g., language processing system 106 of FIG. 1) to identify content segments that capture a single idea or concept. The research synthesis platform may then leverage a synthesis engine (e.g., synthesis engine 122 of FIG. 1) to contextualize each content segment into an insight. Like the insight generation engine, the synthesis engine may construct a prompt for the language processing system to obtain an insight text from a content segment.

The insight-based research synthesis platform may further leverage the synthesis engine to extract structured data from the one or more pieces of content. The synthesis engine may construct a prompt for the language processing system. The prompt may contain a list of possible data points of interest including, but not limited to, statistics, financials, product segments, customer segments, regions, company entities, key purchasing criteria, performance metrics, and the like.

At step 1104, the insight-based research synthesis platform may create a plurality of insight vector embeddings from the plurality of insights. The insight vector embeddings may contain numerical representations of the insight text contained within the insights. In some aspects, the insight-based research synthesis platform leverages a vectorization engine (e.g., vectorization engine 114 of FIG. 1) to convert the insight texts obtained from the one or more pieces of source content into a corresponding set of vector embeddings (e.g., using any of the techniques disclosed above).

At step 1106, the insight-based research synthesis platform may receive a query from a user. For example, the insight-based research synthesis platform may receive a client or system query (e.g., user query 142 from client device 104) to display information relating to content (e.g., content 132 stored in a data store (e.g., 126)). For example, the user query may request that a column describing growth metrics for company A be added to an existing table or form the start of a new table.

At step 1108, the insight-based research synthesis platform may identify insights, source content, metadata, and/or other information relevant to the user query, for example, using the insight vector embeddings. For example, the insight-based research platform 102 may leverage a semantic search engine (e.g., semantic search engine 116 of FIG. 1) or other algorithms (e.g. retrieving structured groups of headers deterministically given user inputs) to perform one or more search retrieval methods on the insights, source content, metadata, and/or other information.

At step 1110, the insight-based research synthesis platform may generate a series of headers from the identified insights, source content, metadata, and/or other information corresponding to the user query. For example, the insight-based research synthesis platform may utilize the synthesis engine to construct a prompt for the language processing system to identify a headers/themes that summarize principal concepts, entities, or topics across identified insights, source content, metadata, and/or other information.

At step 1112, the insight-based research synthesis platform may generate a series of answers corresponding to the series of headers. For example, the insight-based research synthesis platform may leverage a synthesis engine (e.g., synthesis engine 122) to construct a prompt for the language processing system to extract answers to the headers from the identified insights, metadata, source content, or other information. The prompt may specify a final format for the answers, such as "numerical values" or "three words or less," to name a couple of non-limiting examples.

Alternatively, the research synthesis platform may leverage a semantic search engine (e.g., semantic search engine 116 of FIG. 1) to generate the set of answers. For example, the semantic search engine may perform one or more search and retrieval methods on the identified insights, metadata, source content, or other information.

Each header in the series of headers may have more than one corresponding answer. For example, a given header may have an answer corresponding to each piece of source content in the one or more pieces of source content from which the insights were extracted. The synthesis/semantic search engine may create a header and answer (H&A) data structure that connects the each answer within the series of answers to its corresponding source content descriptor and header.

At step 1116, the insight-based research synthesis platform may generate visual displays with data contained in the H&A data structure. The visual displays may include tables, lists, ranked lists, categorized lists, graphs, line charts, pie charts, bar charts, scatter plots, histograms, distributions, key metric overviews, process flow diagrams, word maps, graphical maps, network diagrams, and the like. The insight-based research synthesis engine may leverage a display engine to generate the visual displays, as described in reference to FIGS. 7-9.

Figure 12:
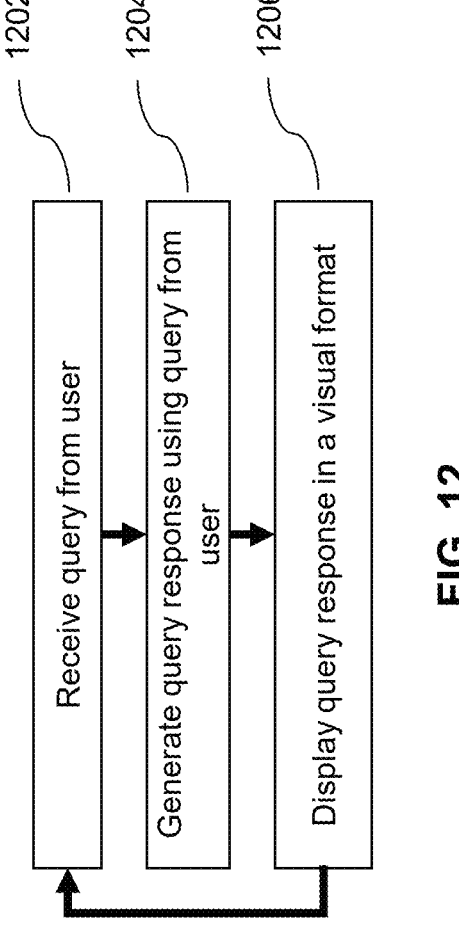
FIG. 12 shows an alternative method for generating a visual display from a user query, according to some aspects.

FIG. 12 shows a block diagram of a method 1200, according to some aspects. Method 1200 may describe a process for populating a visual display in response to a user query. The steps of method 1200 described below may be implemented by processing logic that may comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than described for FIG. 12, as will be understood by a person of ordinary skill in the art. Method 1200 shall be described with reference to FIGS. 1-11. However, method 1200 is not limited to those example aspects.

At step 1202, an insight-based research synthesis platform may receive a query from a user. For example, the insight-based research synthesis platform may receive a client or system query (e.g., user query 142 from client device 104) to display information relating to content (e.g., content 132 stored in a data store (e.g., 126)). For example, the user query may request that a column describing growth metrics for company A be added to an existing table or form the start of a new table.

At step 1204, the insight-based research synthesis platform may generate a query response. The insight-based research synthesis platform may leverage a synthesis engine (e.g., synthesis engine 122 of FIG. 1) to generate a query response that contains one or more headers relating to the user query and corresponding answers. For example, the synthesis engine may generate and send a prompt to language processing system for creating one or more headers using the user query. The synthesis engine may then generate and send a second prompt to the language processing system for extracting answers to the one or more headers using the user headers, insights, and/or structured data.

Alternatively, the insight-based research synthesis platform may use a semantic search engine (e.g., semantic search engine 116 of FIG. 1) to extract answers to one or more headers from the insights (e.g., insights associated with a project (e.g., project 226) or angle (e.g., angle 228)), associated structured data (e.g., from metadata 218), or other information sources or content.

At step 1206, the insight-based research synthesis platform may populate a visual display with data contained within the query response generated at step 1104. For example, the insight-based research synthesis platform may utilize a display engine (e.g., display engine 135 of FIG. 1) to populate cells in a table with the headers and answers in the query response, as described in FIG. 7. The display engine may also generate a graph or bar chart, as described in FIGS. 8 and 9.

In some aspects, steps 1202-1206 may be repeated. For example, a user may submit additional queries to add more data to the visual display.

Figure 13:
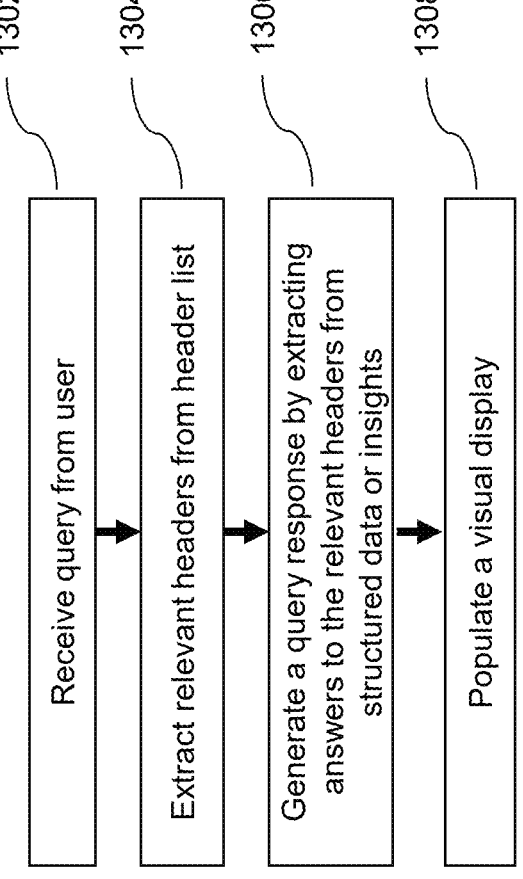
FIG. 13 shows another alternative method for generating a visual display from a user query, according to some aspects.

FIG. 13 shows a block diagram of a method 1300, according to some aspects. Method 1300 may describe another process for populating a visual display in response to a user query. The steps of method 1300 described below may be implemented by processing logic that may comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than described for FIG. 13, as will be understood by a person of ordinary skill in the art. Method 1300 shall be described with reference to FIGS. 1-12. However, method 1300 is not limited to those example aspects.

At step 1302, an insight-based research synthesis platform may receive a query from a user. For example, the insight-based research synthesis platform may receive a client or system query (e.g., user query 142 from client device 104) to display information relating to content (e.g., content 132 stored in a data store (e.g., 126)). For example, the user query may request the financials of company A for a given year.

At step 1304, the insight-based research synthesis platform may extract one or more relevant headers from a header list. The header list may be an example of data structures 210 of FIG. 2. The insight-based research synthesis platform may leverage a semantic search engine (e.g., semantic search engine 116 of FIG. 1) to identify the headers(s) in the header list that best match the user query. For example, the semantic search engine may compare a vector embedding of the user query to vector embeddings of headers contained in the header list. Alternatively or additionally, the semantic search engine may compare a vector embedding of the user query to vector embeddings of header themes contained in the header list to identify the most relevant header themes. Following this, relevant headers may be extracted from the identified header themes.

At step 1306, the insight-based research synthesis platform may generate a query response by extracting answers to the relevant headers from structured data and/or insights. For example, the insight-based research synthesis platform may leverage the semantic search engine to identify headers and corresponding answers (or data points) in the structured data or insights that best match the relevant headers (e.g., based on vector similarity). Then, the semantic search engine can populate the user query response with the relevant headers and corresponding answers.

Alternatively, the insight-based research synthesis platform may leverage a synthesis engine (e.g., synthesis engine 122 of FIG. 1) to generate and send a prompt for generating answers to relevant headers using insights and/or structured data. Then, the synthesis engine may populate the user query response with the relevant headers and corresponding answers.

At step 1308, the insight-based research synthesis platform may generate a visual display using data contained in the user query response. For example, the insight-based research synthesis platform may leverage a display engine (e.g., display engine 135 of FIG. 1) to generate a table, graph, bar chart, or the like, as described in FIGS. 7, 8, and 9.

Figure 14:
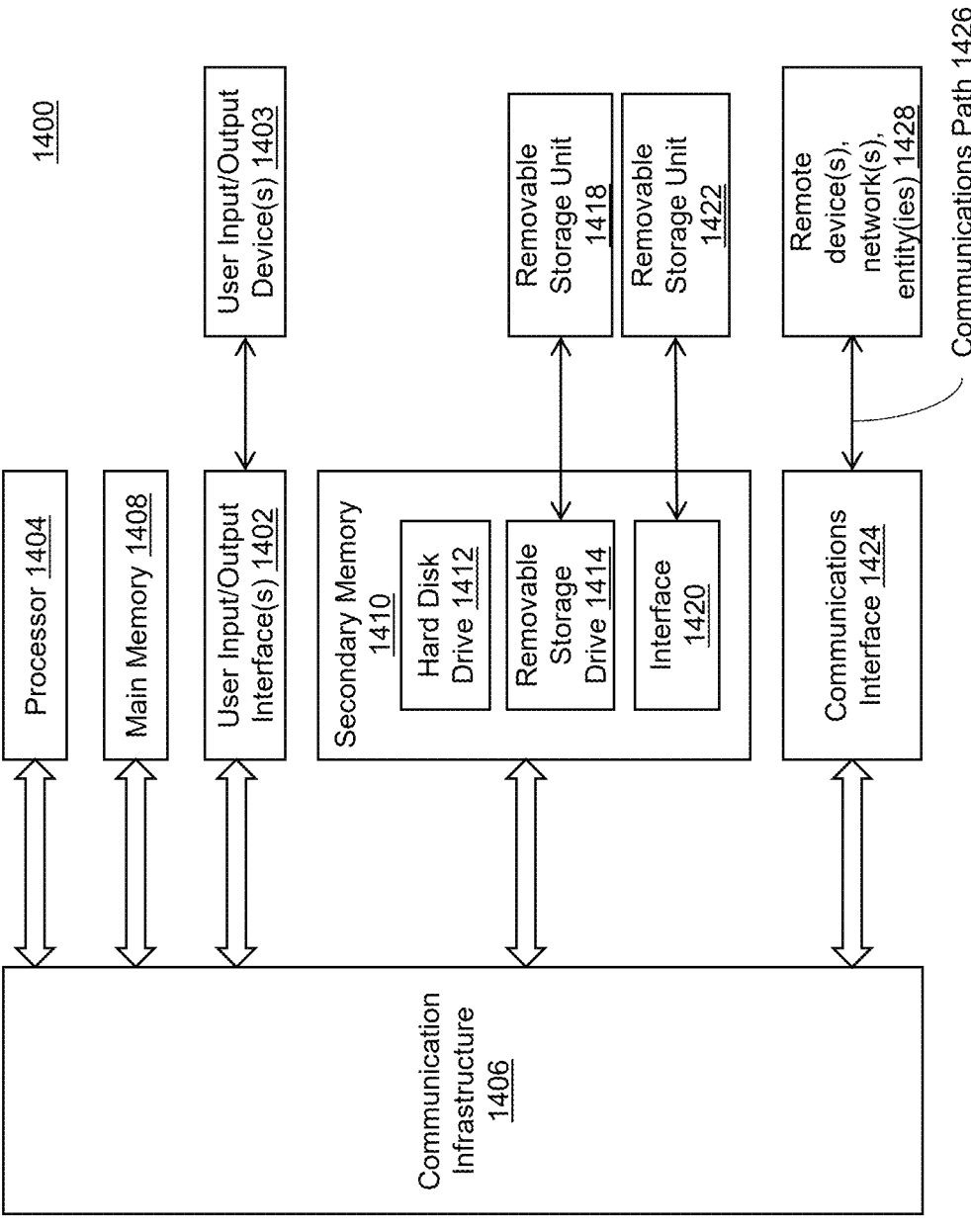
FIG. 14 shows an example computer system, according to some aspects.

FIG. 14 depicts an example computer system useful for implementing various aspects described herein.

Various aspects may be implemented, for example, using one or more well-known computer systems, such as computer system 1400 shown in FIG. 14. One or more computer systems 1400 may be used, for example, to implement any of the aspects discussed herein, as well as combinations and sub-combinations thereof. For example, the example computer system may be implemented as part of insight-based research synthesis platform 102, client device 104, LPS 106, content curation platform 108, etc. Cloud implementations may include one or more of the example computer systems operating locally or distributed across one or more server sites.

Computer system 1400 may include one or more processors (also called central processing units, or CPUs), such as a processor 1404. Processor 1404 may be connected to a communication infrastructure or bus 1406.

Computer system 1400 may also include customer input/output device(s) 1402, such as monitors, keyboards, pointing devices, etc., which may communicate with communication infrastructure 1406 through customer input/output interface(s) 1402.

One or more of processors 1404 may be a graphics processing unit (GPU). In an aspect, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1400 may also include a main or primary memory 1408, such as random access memory (RAM). Main memory 1408 may include one or more levels of cache. Main memory 1408 may have stored therein control logic (i.e., computer software) and/or data.

Computer system 1400 may also include one or more secondary storage devices or memory 1410. Secondary memory 1410 may include, for example, a hard disk drive 1412 and/or a removable storage device or drive 1414. Removable storage drive 1414 may be a floppy disk drive, a magnetic tape drive, a compact disk drive, an optical storage device, tape backup device, and/or any other storage device/drive.

Removable storage drive 1414 may interact with a removable storage unit 1416. Removable storage unit 1416 may include a computer usable or readable storage device having stored thereon computer software (control logic) and/or data. Removable storage unit 1416 may be a floppy disk, magnetic tape, compact disk, DVD, optical storage disk, and/any other computer data storage device. Removable storage drive 1414 may read from and/or write to removable storage unit 1416.

Secondary memory 1410 may include other means, devices, components, instrumentalities or other approaches for allowing computer programs and/or other instructions and/or data to be accessed by computer system 1400. Such means, devices, components, instrumentalities or other approaches may include, for example, a removable storage unit 1422 and an interface 1420. Examples of the removable storage unit 1422 and the interface 1420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1400 may further include a communication or network interface 1424. Communication interface 1424 may enable computer system 1400 to communicate and interact with any combination of external devices, external networks, external entities, etc. (individually and collectively referenced by reference number 1428). For example, communication interface 1424 may allow computer system 1400 to communicate with external or remote devices 1428 over communications path 1426, which may be wired and/or wireless (or a combination thereof), and which may include any combination of LANs, WANs, the Internet, etc. Control logic and/or data may be transmitted to and from computer system 1400 via communication path 1426.

Computer system 1400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML Customer Interface Language (XUL), or any other functionally similar representations alone or in combination. Alternatively, proprietary data structures, formats or schemas may be used, either exclusively or in combination with known or open standards.

In some aspects, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1400, main memory 1408, secondary memory 1410, and removable storage units 1416 and 1422, as well as tangible articles of manufacture embodying any combination of the foregoing. Such control logic, when executed by one or more data processing devices (such as computer system 1400), may cause such data processing devices to operate as described herein.

Based on the teachings contained in this disclosure, it will be apparent to persons skilled in the relevant art(s) how to make and use aspects of this disclosure using data processing devices, computer systems and/or computer architectures other than that shown in FIG. 14. In particular, aspects can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosed technology that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the disclosed technology should not be limited by any of the above-described exemplary embodiments, but should be defined only in accordance with the following claims and their equivalents.

What is claimed is:

1. A computer-implemented method comprising:
generating, by a language processing system, insights from one or more pieces of content;
generating vector embeddings of the insights;
clustering the vector embeddings of the insights into a plurality of clusters;
generating, a set of headers for a table by inputting the vector embeddings contained in each cluster of the plurality of clusters into a prompt and sending the prompt to the language processing system, wherein each header in the set of headers describes content contained in a cluster of the plurality of clusters;
retrieving answers to the set of headers from the vector embedding of the insights; and
populating the table on a display, wherein each cell of the table contains an answer to at least one of the headers in the set of headers associated with at least one piece of content in the one or more pieces of content.

2. The method of claim 1, wherein the generating, by the language processing system, insights from one or more pieces of content further comprises extracting structured data from the one or more pieces of content.

3. The method of claim 2, wherein the retrieving further comprises searching the structured data to retrieve answers to the set of headers using semantic search.

4. The method of claim 2, wherein the structured data contains tagged entities and related metrics.

5. The method of claim 1, further comprising augmenting the set of headers with headers input by a user via a user interface.

6. The method of claim 1, wherein the retrieving further comprises searching the one or more pieces of content for an answer to a header in the set of headers using semantic search.

7. The method of claim 1, wherein the retrieving further comprising prompting the language processing system to extract the answers to the set of headers using a prompt, wherein the prompt comprises the set of headers and the vector embeddings of the insights.

8. A system comprising:
a memory; and
a processor coupled to the memory configured to:
generate insights from one or more pieces of content;
generate vector embeddings of the insights;
cluster the vector embeddings of the insights into a plurality of clusters;
generate a set of headers for a table by inputting the vector embeddings contained in each cluster of the plurality of clusters into one or more prompts and sending the one or more prompts to a language processing system, wherein each header in the set of headers describes content contained in a cluster of the plurality of clusters;
retrieve answers to the set of headers from the vector embeddings of the insights to retrieve answers to the set of headers; and
populate the table on a display, wherein each cell of the table contains an answer to a header in the set of headers associated with a piece of content in the one or more pieces of content.

9. The system of claim 8, wherein the processor is further configured to extract structured data from the one or more pieces of content.

10. The system of claim 9, wherein the processor is further configured to search the structured data to retrieve answers to the set of headers using semantic search.

11. The system of claim 9, wherein the structured data contains tagged entities and related metrics.

12. The system of claim 8, wherein the processor is further configured to augment the set of headers with headers input by a user via a user interface.

13. The system of claim 8, wherein the processor is further configured to search the one or more pieces of content for an answer to a header in the set of headers using semantic search.

14. The system of claim 8, wherein the processor is further configured to prompt the language processing system to extract the answers to the set of headers using a prompt, wherein the prompt comprises the set of headers and the vector embeddings of the insights.

15. A non-transitory machine-readable storage medium having instructions stored thereon that, when executed by a set of one or more processors, cause said set of one or more processors to perform operations comprising:
generating insights from one or more pieces of content;
generating vector embeddings of the insights;
clustering the vector embeddings of the insights into a plurality of clusters;
generating, a set of headers for a table by inputting the vector embeddings contained in each cluster of the plurality of clusters into one or more prompts and sending the one or more prompts to a language processing system, wherein each header in the set of headers describes content contained in a cluster of the plurality of clusters;

retrieving answers to the set of headers from the vector embedding of the insights; and populating a table on a display, wherein each cell of the table contains an answer to at least one of the headers in the set of headers associated with at least one of the pieces of content in the one or more pieces of content.

16. The non-transitory machine-readable storage medium of claim 15, the operations further comprising extracting structured data from the one or more pieces of content.

17. The non-transitory machine-readable storage medium of claim 16, the operations further comprising searching the structured data to retrieve answers to the set of headers using semantic search.

18. The non-transitory machine readable storage medium of claim 16, the operations further comprising prompting the language processing system to extract the answers to the set of headers using a prompt, wherein the prompt comprises the set of headers and the vector embeddings of the insights.

19. The non-transitory machine-readable storage medium of claim 15, the operations further comprising augmenting the set of headers with headers input by a user via a user interface.

20. The non-transitory machine-readable storage medium of claim 15, the operations further comprising searching the one or more pieces of content for an answer to a header in the set of headers using semantic search.

\* \* \* \* \*